US012786347B2

(12) United States Patent
Choi et al.

(10) Patent No.: US 12,786,347 B2
(45) Date of Patent: *Nov. 3, 2026

(54) ELECTRONIC APPARATUS, CONTROLLING METHOD OF ELECTRONIC APPARATUS, AND COMPUTER READABLE MEDIUM

(71) Applicant: SAMSUNG ELECTRONICS CO., LTD., Suwon-si (KR)

(72) Inventors: Junkwon Choi, Suwon-si (KR); Sangkyu Kang, Suwon-si (KR); Dongjin Jung, Suwon-si (KR); Kyuchun Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/912,706

(22) Filed: Oct. 11, 2024

(65) Prior Publication Data

US 2025/0039329 A1 Jan. 30, 2025

Related U.S. Application Data

(63) Continuation of application No. 18/069,296, filed on Dec. 21, 2022, now Pat. No. 12,142,021, which is a
(Continued)

(30) Foreign Application Priority Data

Dec. 7, 2018 (KR) ........................ 10-2018-0157170

(51) Int. Cl.
*H04N 5/77* (2006.01)
*G06N 3/0464* (2023.01)
(Continued)

(52) U.S. Cl.
CPC ............... *H04N 5/77* (2013.01); *G06V 10/44* (2022.01); *G06V 10/443* (2022.01); *G06V 10/75* (2022.01);
(Continued)

(58) Field of Classification Search
CPC .......... H04N 5/77; H04N 23/64; H04N 23/80; H04N 23/617; G06V 10/44; G06V 10/443;
(Continued)

(56) References Cited

U.S. PATENT DOCUMENTS 7,664,389 B2 2/2010 Kretz et al.
8,681,235 B2 3/2014 Choi et al.
(Continued)

FOREIGN PATENT DOCUMENTS

CN 106210541 A 12/2016
CN 107343162 A 11/2017
(Continued)

OTHER PUBLICATIONS

Communication dated Jul. 22, 2024, issued by the China National Intellectual Property Administration in counterpart Chinese Application No. 201980080530.2.
(Continued)

*Primary Examiner* — Ahmed A Berhan
(74) *Attorney, Agent, or Firm* — Sughrue Mion, PLLC

(57) ABSTRACT

An electronic apparatus is provided. The electronic apparatus includes: a camera; a processor configured to control the camera; and a memory configured to be electrically connected to the processor and to store a network model trained to determine a degree of matching between an input image frame and predetermined feature information, wherein the processor is configured to: identify a representative image frame based on a degree of matching obtained by applying
(Continued)

image frames, selected from among a plurality of image frames, to the trained network model, while the plurality of image frames are captured through the camera, identify a best image frame based on a degree of matching obtained by applying image frames within a specific section including the identified representative image frame, to the trained network model, and provide the identified best image frame.

15 Claims, 14 Drawing Sheets

Related U.S. Application Data continuation of application No. 16/707,105, filed on Dec. 9, 2019, now Pat. No. 11,558,545.

(51) Int. Cl.

| | |
|---|---|
| ***G06N 3/08*** | (2023.01) |
| ***G06N 3/092*** | (2023.01) |
| ***G06V 10/44*** | (2022.01) |
| ***G06V 10/74*** | (2022.01) |
| ***G06V 10/75*** | (2022.01) |
| ***G06V 20/40*** | (2022.01) |
| ***G06V 40/16*** | (2022.01) |
| ***G06V 40/20*** | (2022.01) |
| ***H04N 23/60*** | (2023.01) |
| ***H04N 23/617*** | (2023.01) |
| ***H04N 23/80*** | (2023.01) |

(52) U.S. Cl.

CPC ............ *G06V 10/761* (2022.01); *G06V 20/46* (2022.01); *G06V 20/48* (2022.01); *G06V 40/176* (2022.01); *G06V 40/23* (2022.01); *H04N 23/64* (2023.01); *H04N 23/80* (2023.01); *G06V 20/44* (2022.01)

(58) Field of Classification Search

CPC ...... G06V 10/75; G06V 10/761; G06V 20/46; G06V 20/48; G06V 40/176; G06V 40/23; G06V 20/44; G06F 18/22; G06N 3/045; G06N 3/0464; G06N 3/09; G06N 3/08; G06N 3/084; G06N 3/092

See application file for complete search history.

(56) References Cited

U.S. PATENT DOCUMENTS

| | | | | |
|---|---|---|---|---|
| 9,020,244 | B2 * | 4/2015 | van Zwol | G06V 20/47 382/305 |
| 9,485,452 | B2 | 11/2016 | Kato | |
| 10,063,778 | B2 | 8/2018 | Brunner et al. | |
| 2009/0087099 | A1 | 4/2009 | Nakamura | |
| 2010/0020224 | A1 | 1/2010 | Hattori et al. | |
| 2010/0118205 | A1 | 5/2010 | Sohma et al. | |
| 2012/0300092 | A1 | 11/2012 | Kim et al. | |
| 2013/0142418 | A1 | 6/2013 | van Zwol et al. | |
| 2013/0265451 | A1 * | 10/2013 | Son | H04N 23/62 348/207.1 |
| 2014/0286627 | A1 * | 9/2014 | Kato | H04N 5/772 386/278 |
| 2016/0188997 | A1 * | 6/2016 | Desnoyer | G06V 20/46 382/190 |
| 2017/0017844 | A1 | 1/2017 | Jeong et al. | |
| 2018/0005077 | A1 * | 1/2018 | Wang | G06F 18/2178 |
| 2019/0180109 | A1 * | 6/2019 | Sinha | H04N 21/4223 |

FOREIGN PATENT DOCUMENTS

| | | | |
|---|---|---|---|
| CN | 107910024 | A | 4/2018 |
| CN | 108198177 | A | 6/2018 |
| CN | 108307116 | A | 7/2018 |
| JP | 10-111946 | A | 4/1998 |
| JP | 2010-239169 | A | 10/2010 |
| JP | 5086429 | B2 | 11/2012 |
| KR | 10-2014-0026512 | A | 3/2014 |
| KR | 10-1383988 | B1 | 4/2014 |
| KR | 10-2014-0116012 | A | 10/2014 |
| KR | 10-2015-0028589 | A | 3/2015 |
| KR | 10-1669463 | B2 | 10/2016 |
| KR | 10-2017-0009037 | A | 1/2017 |
| KR | 10-2018-0055708 | A | 5/2018 |
| WO | 2013/160524 | A1 | 10/2013 |
| WO | 2015/179021 | A1 | 11/2015 |

OTHER PUBLICATIONS

European Communication dated Jun. 23, 2023 issued by the EP Patent Office in Application No. 19 893 413.5.

Communication dated Aug. 16, 2021 issued by the European Intellectual Property Office in counterpart European Application No. 19893413.5.

Communication dated Feb. 5, 2020, issued by the Korean Intellectual Property Office in corresponding Korean Application No. 10-2018-0157170.

International Search Report (PCT/ISA/210), issued by International Searching Authority in corresponding International Application No. PCT/KR2019/017180, on Mar. 17, 2020.

Written Opinion (PCT/ISA/237) issued by the International Searching Authority in corresponding International Application No. PCT/KR2019/017180, on Mar. 17, 2020.

U.S. Appl. No. 18/069,296, filed Dec. 21, 2022.

U.S. Appl. No. 16/707,105, filed Dec. 9, 2019.

Communication issued on Apr. 24, 2025 from the China National Intellectual Property Administration for Chinese Patent Application No. 201980080530.2.

Communication issued on Jun. 16, 2025 from the China National Intellectual Property Administration for Chinese Patent Application No. 201980080530.2.

European Communication dated Jun. 27, 2025 issued by the EP Patent Office in Application No. 19 893 413.5.

Communication issued on Jan. 15, 2025 from the China National Intellectual Property Administration for Chinese Patent Application No. 201980080530.2.

Communication issued on Feb. 17, 2025 from the European Patent Office for European Patent Application No. 19893413.5.

* cited by examiner

ELECTRONIC APPARATUS, CONTROLLING METHOD OF ELECTRONIC APPARATUS, AND COMPUTER READABLE MEDIUM

CROSS-REFERENCE TO RELATED APPLICATION(S)

This application is a continuation application of U.S. patent application Ser. No. 18/069,296, filed Dec. 21, 2022, which is a continuation application of U.S. patent application Ser. No. 16/707,105, filed Dec. 9, 2019, now U.S. Pat. No. 11,558,545, issued Jan. 17, 2023, which is based on and claims priority under 35 U.S.C. § 119 to Korean Patent Application No. 10-2018-0157170, filed on Dec. 7, 2018, in the Korean Intellectual Property Office, the disclosures of which are incorporated herein in their entirety by reference.

BACKGROUND

1. Field

The disclosure relates to an electronic apparatus, and more particularly, to an electronic apparatus for providing a best image photographed at the most appropriate (user's desired) moment in a video photographed by a user.

The disclosure also relates to an electronic apparatus for optimizing a computation process and a controlling method thereof in selecting a best image among a plurality of images according to an artificial intelligence (AI) system that mimics functions of a human's brain, such as cognition, determination, and the like, using a machine training algorithm and an application thereof.

2. Description of the Related Art

For a common user, it is generally difficult to take a picture that captures a desired moment, such as the moment at which a bat of a baseball player meets a ball and the moment at which a character on a screen smiles. The reason is that there is a delay between the moment at which a shutter is pressed and the moment at which an actual image capturing is performed, but most of all, it is not easy to predict when the desired moment will occur.

In order to solve such an inconvenience, various techniques have been proposed in the related art.

As an example, there has been provided an electronic apparatus that continuously photographs images for a specific time and allows the user to select the most desired picture among the photographed images. However, the consequence of this method is that a large number of unnecessary images remain in the memory as a result of the shooting, and the user has to directly select one image among the images.

In addition, there has been provided a photographing apparatus implemented to take a picture at a moment when one or more objects in the image match a predetermined composition (e.g., a moment when the bat of the baseball player is located on a specific line to meet the ball). However, with this method there is a disadvantage in that a utility range is very limited to only a given composition and installation of a tripod is necessary to maintain the composition.

An artificial intelligence (AI) system is a computer system implementing human-level intelligence, and is a system in which a machine performs learning and determination by oneself and becomes smart, unlike an existing rule-based smart system. As the artificial intelligence system becomes more common, a recognition rate is improved and a user's taste may be more accurately understood. Therefore, the existing rule-based smart system has been gradually replaced by a deep learning-based artificial intelligence system.

An artificial intelligence technology includes machine learning (deep learning) and element technologies using the machine learning.

The machine learning is an algorithm technology of classifying and learning features of input data by oneself. Further, the element technology is a technology that mimics functions of a human brain such as recognition, determination, and the like using a machine learning algorithm such as deep learning, or the like, and includes technical fields such as linguistic understanding, visual understanding, inference/prediction, knowledge representation, a motion control, and the like.

The various fields to which the artificial intelligence technology is applied are as follows. The linguistic understanding is a technology of recognizing and applying/processing human languages/characters, and includes natural language processing, machine translation, a dialog system, question and answer, speech recognition/synthesis, and the like. The visual understanding is a technology of recognizing and processing things like human vision, and includes object recognition, object tracking, image search, human recognition, scene understanding, space understanding, image improvement, and the like. The inference/prediction is a technology of determining and logically inferring and predicting information, and includes knowledge/probability-based inference, optimization prediction, preference-based planning, recommendation, and the like. The knowledge representation is a technology of automating and processing human experience information as knowledge data, and includes knowledge establishment (data generation/classification), knowledge management (data utilization), and the like. The motion control is a technology of controlling autonomous driving of a vehicle, a motion of a robot, and the like, and includes a motion control (navigation, collision, driving), an operation control (behavior control), and the like.

For example, based on an artificial intelligence model learned through various images, it may be determined whether an input image includes a specific element and/or how much the input image matches a predetermined feature or image.

SUMMARY

Provided are an electronic apparatus and a method of operating the same, for providing a best image photographed at the most appropriate (user's desired) moment in a video photographed by a user.

Additional aspects will be set forth in part in the description which follows and, in part, will be apparent from the description, or may be learned by practice of the presented embodiments.

In accordance with an aspect of the disclosure, an electronic apparatus includes: a camera; a processor configured to control the camera; and a memory configured to be electrically connected to the processor and to store a network model trained to determine a degree of matching between an input image frame and predetermined feature information, wherein the memory stores at least one instruction, and wherein the processor is configured, by executing the at least one instruction, to: identify a representative image frame based on a degree of matching obtained by applying image frames, selected from among a plurality of image frames, to the trained network model, while the plurality of image frames are captured through the camera, identify a best image frame based on a degree of matching obtained by applying image frames within a specific section including the identified representative image frame, from among the plurality of image frames, to the trained network model, and provide the identified best image frame.

The selected image frames may include image frames captured at a constant time interval among the plurality of image frames; and the constant time interval may be determined based on a determination speed of the trained network model.

The processor may be further configured to execute the at least one instruction to: obtain, for each of the selected image frames, a score corresponding to the degree of matching by applying the selected image frames to the trained network model; and identify the representative image frame having a highest score among image frames in which the obtained score is greater than or equal to a predetermined threshold.

The processor may be further configured to execute the at least one instruction to: obtain, for each of the image frames within the specific section, a score corresponding to the degree of matching by applying the image frames within the specific section to the trained network model; and identify the best image frame as having a highest score among the obtained scores.

The processor may be further configured to execute the at least one instruction to: obtain a plurality of image frames of low quality by lowering a resolution of the plurality of image frames; identify a representative image frame of low quality by applying image frames, selected from among the plurality of image frames of low quality, to the trained network model; and identify the best image frame by applying the image frames within the specific section including the representative image frame corresponding to the representative image frame of low quality, from among the plurality of image frames, to the trained network model.

The processor may be further configured to execute the at least one instruction to: delete image frames before a first image frame among the plurality of image frames, based on a score corresponding to the degree of matching of the first image frame among the selected image frames being less than a predetermined threshold; and identify the first image frame as the representative image frame, based on the score of the first image frame being greater than or equal to the predetermined threshold.

The processor may be further configured to execute the at least one instruction to: delete the image frames before the first image frame among the plurality of image frames, based on the score of the first image frame being greater than or equal to the predetermined threshold, and a score corresponding to a degree of matching of a second image frame following the first image frame among the selected image frames being greater than the score of the first image frame; and identify the second image frame as the representative image frame.

The processor may be further configured to execute the at least one instruction to: divide the plurality of image frames into a plurality of events based on the degree of matching of the selected image frames; and identify the best image frame for each of the plurality of events.

The processor may be further configured to execute the at least one instruction to determine that a first image frame and a third image frame correspond to different events, based on a score corresponding to a degree of matching of the first image frame among the selected image frames being greater than or equal to a predetermined threshold, a score corresponding to a degree of matching of a second image frame captured after the first image frame being less than the predetermined threshold, and a score corresponding to a degree of matching of the third image frame captured after the second image frame being greater than or equal to the predetermined threshold.

The trained network model may be trained based on a plurality of images matching the feature information and a plurality of images that do not match the feature information; and the feature information may be related to at least one of one or more objects included in an image, an action of the one or more objects, an expression of the one or more objects, or a situation corresponding to the image.

In accordance with another aspect of the disclosure, a controlling method of an electronic apparatus includes a memory configured to store a network model trained to determine a degree of matching between an input image frame and predetermined feature information, the controlling method including: identifying a representative image frame based on a degree of matching obtained by applying image frames, selected from among a plurality of image frames, to the trained network model, while the plurality of image frames are captured through a camera; identifying a best image frame based on a degree of matching obtained by applying image frames within a specific section including the identified representative image frame, from among the plurality of image frames, to the trained network model; and providing the identified best image frame.

The identifying the representative image frame may include: applying, to the trained network model, the image frames selected from among the plurality of image frames at a constant time interval, wherein the constant time interval may be determined based on a determination speed of the trained network model.

The identifying the representative image frame may include: obtaining, for each of the selected image frames, a score corresponding to the degree of matching by applying the selected image frames to the trained network model; and identifying the representative image frame having a highest score among image frames in which the obtained score is greater than or equal to a predetermined threshold.

The identifying the best image frame may include: obtaining, for each of the image frames within the specific section, a score corresponding to the degree of matching by applying the image frames within the specific section to the trained network model; and identifying the best image frame as having a highest score among the obtained scores.

The controlling method may further include: obtaining a plurality of image frames of low quality by lowering a resolution of the plurality of image frames; and identifying a representative image frame of low quality by applying image frames, selected from among the plurality of image frames of low quality, to the trained network model, wherein the identifying the best image frame may include applying the image frames within the specific section including the representative image frame corresponding to the representative image frame of low quality, from among the plurality of image frames, to the trained network model.

The identifying the representative image frame may include: deleting image frames before a first image frame among the plurality of image frames, based on a score corresponding to the degree of matching of the first image frame among the selected image frames being less than a predetermined threshold; and identifying the first image frame as the representative image frame, based on the score of the first image frame being greater than or equal to the predetermined threshold.

The identifying the representative image frame may include: deleting the image frames before the first image frame among the plurality of image frames, based on the score of the first image frame being greater than or equal to the predetermined threshold, and a score corresponding to a degree of matching of a second image frame following the first image frame among the selected image frames being greater than the score of the first image frame; and identifying the second image frame as the representative image frame.

The controlling method may further include: dividing the plurality of image frames into a plurality of events based on the degree of matching of the selected image frames, wherein the identifying the best image frame may include identifying the best image frame for each of the plurality of events.

The dividing the plurality of image frames into the plurality of events may include: determining that a first image frame and a third image frame correspond to different events, based on a score corresponding to a degree of matching of the first image frame among the selected image frames being greater than or equal to a predetermined threshold, a score corresponding to a degree of matching of a second image frame captured after the first image frame being less than the predetermined threshold, and a score corresponding to a degree of matching of the third image frame captured after the second image frame being greater than or equal to the predetermined threshold.

In accordance with another aspect of the disclosure, a non-transitory computer readable medium has stored thereon computer instructions executable by a processor of an electronic apparatus to cause the electronic apparatus to perform: identifying a representative image frame based on a degree of matching obtained by applying image frames, selected from among a plurality of image frames, to a trained network model, while the plurality of image frames are captured through a camera; identifying a best image frame based on a degree of matching obtained by applying image frames within a specific section including the identified representative image frame, from among the plurality of image frames, to the trained network model; and providing the identified best image frame, wherein the trained network model is stored in a memory of the electronic apparatus and is trained to determine a degree of matching between an input image frame and predetermined feature information.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
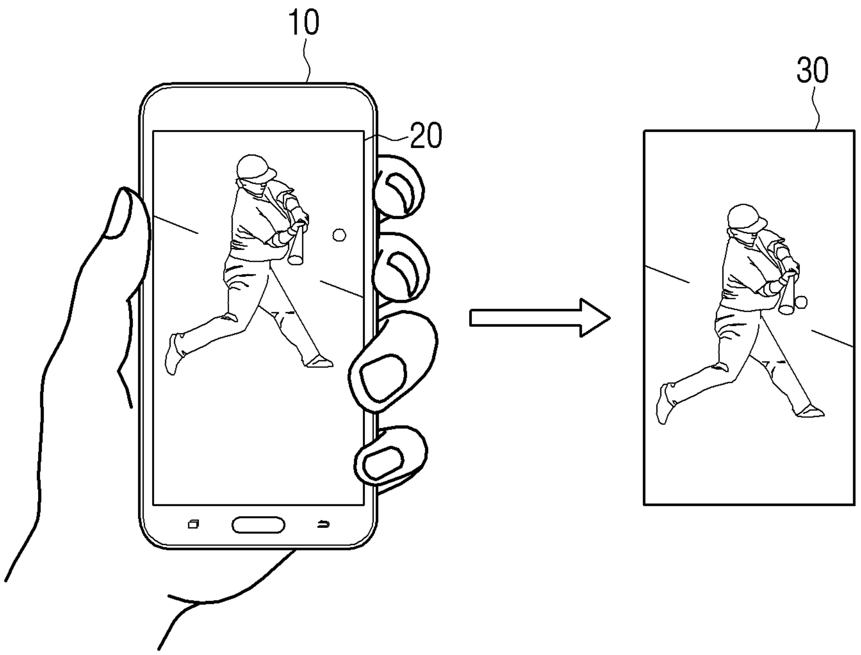
FIG. 1 is a diagram schematically illustrating a process of providing a best image frame by an electronic apparatus according to an embodiment viewed from a viewpoint of a user of the electronic apparatus.

One or more embodiments provide an electronic apparatus that identifies and provides the most appropriate best image frame from among a plurality of image frames included in a corresponding video even if a user does not press a shutter once the video is photographed.

Further, one or more embodiments provide an electronic apparatus that automatically provides an image frame corresponding to one or more situations desired by a user using a pre-learned artificial intelligence model.

In particular, one or more embodiments provide an electronic apparatus that uses an optimal method for providing a best image frame at the fastest speed in analyzing a plurality of image frames in a video using an artificial intelligence model having a limited computational speed.

It is understood that the terms used in the specification and claims may be generic terms in consideration of the functions in diverse embodiments. However, these terms may vary depending on the intentions of the artisan skilled in the art, legal or technical interpretation, and emergence of new technologies. In addition, some terms are arbitrarily chosen by the applicant. Such terms may be interpreted as defined herein, and may be interpreted based on the general contents of the specification and common technical knowledge in the related art, unless otherwise defined.

In addition, like reference numerals or symbols in the drawings attached to the specification denote parts or components that perform substantially the same functions. For convenience of explanation and understanding, different embodiments will be described using the same reference numerals or symbols. That is, although various components having the same reference numerals are shown in the drawings, the drawings do not imply one embodiment.

In addition, in the specification and claims, the terms including ordinal numbers such as "first" and "second" may be used to distinguish between the components. These ordinal numbers are used to distinguish the same or similar components from each other, and the meaning of the terms should not be construed as being limited by the use of these ordinal numbers. As an example, the components combined with these ordinal numbers should not be limited in order of use or arrangement by the number. The respective ordinal numbers may be interchangeably used, if necessary.

As used herein, the singular forms "a," "an" and "the" include plural forms unless the context clearly indicates otherwise. It should be further understood that terms "include" or "constituted" used in the application specify the presence of features, numerals, steps, operations, components, parts mentioned in the specification, or combinations thereof, but do not preclude the presence or addition of one or more other features, numerals, steps, operations, components, parts, or combinations thereof.

Furthermore, terms such as "module," "unit," "part," and the like are terms for referring to a component that performs at least one function or operation and such a component may be implemented in hardware or software or a combination of hardware and software. In addition, a plurality of "modules," "units," "parts," and the like are integrated into at least one module or chip and implemented as or by at least one processor, except for a case that each needs to be implemented as separate specific hardware.

In addition, in the description, when a part is referred to as being connected to another part, this includes not only a direct connection but also an indirect connection through another medium. In addition, the meaning that a part includes a certain component indicates that the part may further include other components, not to exclude other components, unless otherwise stated.

Hereinafter, it is understood that expressions such as "at least one of," when preceding a list of elements, modify the entire list of elements and do not modify the individual elements of the list. For example, the expressions "at least one of [A], [B], and [C]" or "at least one of [A], [B], or [C]" means only A, only B, only C, A and B, B and C, A and C, or A, B, and C.

FIG. 1 is a diagram schematically illustrating a process of providing a best image frame 30 by an electronic apparatus 10 according to an embodiment viewed from a viewpoint of a user.

Referring to FIG. 1, when a user executes a specific application and/or selects a specific button/user interface, capturing of a video 20 through a camera of an electronic apparatus 10 may be started. In addition, the captured video 20 may be displayed on a display of the electronic apparatus 10. Referring to the example shown in FIG. 1, the captured video 20 is a video including a moment at which a baseball player hits the ball with a bat. In this case, the user may not be aware of the fact that scenes currently being viewed through the display of the electronic apparatus 10 are being stored and analyzed as video data.

In addition, the electronic apparatus 10 may select and provide to the user an image frame of a moment that the user most wants to capture among the image frames included in the captured video 20, that is, an image frame 30 that captures a moment at which the ball hits the bat.

In this case, when a user command to end the video capturing is input to the electronic apparatus 10 or a capturing time exceeds a predetermined time, the video capturing may end and a predetermined number of the best image frames 30 may be found during the capturing or after the capturing ends. In addition, the best image frame 30 may be provided to the user almost at the same time as a moment at which the video capturing ends, or within a very short time from the moment at which the video capturing ends.

In addition, the electronic apparatus 10 may automatically delete all image frames except for the best image frame 30 among the plurality of image frames included in the captured video 20, thereby preventing inconvenience that the user manually deletes the corresponding image frames.

As described above, the electronic apparatus 10 has an effect that the best image frame 30 capturing a moment desired by the user among the plurality of image frames included in the captured video 20 may be quickly provided without the user having to press the shutter, once the user captures a video 20 including a specific scene using the camera and the display of the electronic apparatus 10.

Hereinafter, a configuration and a technical operation of an electronic apparatus 100 for performing the function described with reference to FIG. 1 will be described through one or more embodiments.

Figure 2:
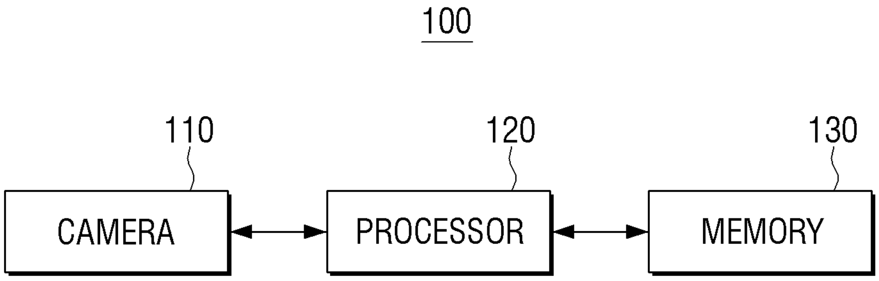
FIG. 2 is a block diagram illustrating a configuration of an electronic apparatus according to an embodiment.

FIG. 2 is a block diagram illustrating a configuration of an electronic apparatus 100 according to an embodiment.

The electronic apparatus 100 may be implemented as various electronic devices capable of photographing (i.e., capturing) a video and processing one or more image frames included in the photographed video, such as a cellular phone, a smartphone, a digital camera, a desktop personal computer (PC), a notebook PC, a tablet PC, a kiosk, a sticker photographing device, a closed circuit television (CCTV) system, an in-vehicle camera system, and the like.

Referring to FIG. 2, the electronic apparatus 100 may include a camera 110, a processor 120, and a memory 130.

The camera 110 is a component for photographing one or more images, and may be implemented as a digital camera including one or more image sensors. The electronic apparatus 100 may include one or more cameras 110.

The image sensor may include a plurality of optical sensors to recognize ambient light. Here, an optical sensor is a component for converting input light into an electrical signal and may be implemented as or include a photodiode.

The image sensor may be implemented as a charge coupled device (CCD), a complementary metal-oxide-semiconductor (CMOS), or the like, but is not limited thereto.

The resolution of the image photographed by the camera 110 may be determined according to the number of optical sensors provided in the camera 110. In this case, the electronic apparatus 100 may adjust the resolution of the photographed image or generate a new image having the resolution different from that of the photographed image, through an image processor controlled by the processor 120.

The electronic apparatus 100 may not only photograph individual images one by one through the camera 110, but also sequentially photograph a plurality of images at constant intervals. In this case, the plurality of images photographed at constant intervals may be a plurality of image frames constituting one or more videos.

The processor 120 (e.g., at least one processor) may control an overall operation of the electronic apparatus 100. To this end, the processor 120 may include a random access memory (RAM), a read only memory (ROM), a central processing unit (CPU), a graphic processing unit (GPU), a system bus, and the like, and may execute operations or data processing relating to the control of one or more components included in the electronic apparatus 100.

The processor 120 may control one or more components included in the electronic apparatus 100 by executing one or more instructions stored in the memory 130, controls one or more components as a hardware circuit or chip, or control one or more components as a combination of software and hardware.

The processor 120 may be electrically connected to and control various components of the electronic apparatus 100 including the camera 110 and the memory 130.

The memory 130 is a component for storing an operating system (OS) for controlling an overall operation of the components of the electronic apparatus 100, and commands or data associated with the components of the electronic apparatus 100.

To this end, the memory 130 may be implemented as a non-volatile memory (e.g., a hard disk, a solid state drive (SSD), or a flash memory), a volatile memory, or the like.

When an image frame is input, the memory 130 may store a network model learned (e.g., trained) to determine a degree of matching between the input image frame and predetermined feature information.

The learned network model may be learned (e.g., trained) through a plurality of images matching the feature information to determine a degree to which the input image matches the corresponding feature information.

The feature information may be related to at least one of one or more objects included in the image, a behavior of the object, an expression of the object, and a situation corresponding to the image. For example, the image matching the feature information may be variously predetermined such as an image including a smiling person, an image including an animal such as a cat/dog staring at the camera, an image of a moment at which several people jump, and a moment at which a bat of a baseball player hits a ball.

That is, the trained network model may be trained through, for example, a plurality of images including the smiling person to determine the degree to which the input image matches the smiling person.

The degree to which the input image matches the feature information may be greater, for example, the greater the degree of smiling of the person in the input image, the greater the height of the jump of several persons in the input image, etc.

The network model may also be trained using a plurality of images matching the feature information and a plurality of images not matching the feature information.

For example, in order to more accurately determine the degree to which the input image matches the feature information of the smiling person, the network model may be trained using not only a plurality of images including the smiling people, but also a plurality of images including non-smiling people, a plurality of images including smiling cartoon characters, and the like. In addition, the network model may be trained through a plurality of images including a faintly smiling person, a plurality of images including a moderately smiling person, a plurality of images including a loudly laughing person, and the like to numerically determine how much the input image matches the feature information of the smiling person.

The network model may be constructed in consideration of an application field of the network model, the purpose of learning, or a computer performance of the apparatus. The network model may be, for example, a model based on a neural network. The network model may be designed to simulate a human brain structure on a computer. The network model may include a plurality of network nodes having weights that simulate neurons in a human neural network. The plurality of network nodes may form a connection relationship so that the neurons simulate synaptic activity through which signals are transmitted and received through synapses. The network model may include, for example, a neural network model or a deep learning model developed from the neural network model. In the deep learning model, the plurality of network nodes may be located at different depths (or layers) and transmit and receive data according to a convolution connection relationship.

The network model may be trained through a deep neural network (DNN) method, and may be implemented as an object detection model for identifying one or more objects within the image for analysis of the image. Specifically, the network model may use a convolutional neural network (CNN), a regional convolutional neural network (RCNN), and the like, but is not limited thereto.

The processor 120 according to an embodiment may determine (analyze) the degree of matching between one or more image frames and predetermined feature information using the trained network model, and may also obtain a score that quantifies the degree of matching.

It may also be assumed that the processor 120 trains the network model, and a specific configuration of the processor 120 for training the network model and/or analyzing the image using the network model is described below with reference to FIGS. 8, 9A and 9B.

The processor 120 may determine the degree of matching with predetermined feature information on the plurality of image frames included in the video photographed by the camera 110 by using the trained network model, and identify one or more image frames having a relatively high degree of matching as the best image frame to provide the best image frame to the user. For example, the processor 120 may control the electronic apparatus 100 to display and/or store, as the best image frame, an image frame having the largest degree of matching with the feature information of the smiling person from among the plurality of image frames included in the photographed video.

Meanwhile, the network model may also be stored in the memory 130 of the electronic apparatus 100 after being trained through one or more external devices, and may also be trained by the processor 120 and stored in the memory 130.

In addition, if the network model is not stored in the electronic apparatus 100, but stored in an external device, while only data for one or more image frames is transmitted to the external device from the electronic apparatus 100, the result of the network model determining the degree of matching between each image and the predetermined feature information may be received by the electronic apparatus 100 from the external device.

However, in general, the user of the electronic apparatus 100, for example, the smartphone, may not want a situation in which a personal image or video photographed through the smartphone is transmitted to an external device for the purpose of identifying only the best image frame. In addition, the time required according to a process of transmitting the data of the image frame from the electronic apparatus 100 to an external device and receiving the determination result by the electronic apparatus 100 again, and variables according to a communication status may not be ignored.

The location of training the trained network model may vary in various embodiments. However, because the trained network model is stored in the memory 130 of the electronic device 100, a process of identifying the best image frame from among the plurality of image frames included in the photographed video, that is, a process of using the network model, may be directly performed in the electronic apparatus 100.

In the case in which the electronic apparatus 100 is a smartphone used by an individual or a PC used in a specific place, a technical operation to provide a suitable best image frame may be performed at high speed, although an artificial intelligence model stored in the memory 130 of the electronic apparatus 100 and the processor 120 have a limit on the speed at which each image frame is analyzed. Hereinafter, specific related embodiments are described.

The processor 120 may acquire (obtain) the degree of matching by applying image frames selected or obtained from the plurality of image frames to the trained network model while the plurality of image frames are photographed by the camera 110. That is, the processor 120 may not analyze all of the plurality of image frames while the plurality of image frames are captured, but may analyze some of the frames.

Specifically, the processor 120 may select image frames photographed at a predetermined time interval among the plurality of image frames, and acquire the degree of matching for only the selected image frames.

In this case, the predetermined time interval may be determined according to a determination speed of the trained network model. As an example, the time interval may be greater than or equal to the time it takes for the processor 120 to apply one image frame to the network model to acquire the degree of matching.

Figure 3:
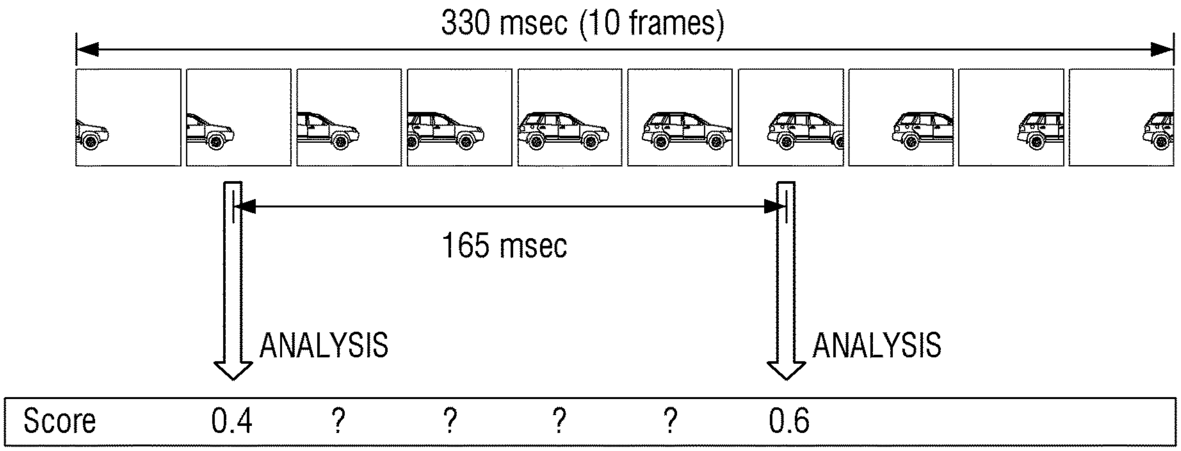
FIG. 3 is a diagram illustrating an example of analyzing a selected image frame among a plurality of image frames.

FIG. 3 is a diagram illustrating an example of analyzing a selected image frame among a plurality of image frames.

In FIG. 3, it is assumed by way of example that 10 image frames are photographed for 330 msec in a video. In addition, in FIG. 3, it is assumed by way of example that the time taken for the trained network model to determine the degree of matching between one image frame and feature information is approximately 160 msec.

Referring to FIG. 3, as a result of considering the analysis speed of the network model, it may be seen that only one image frame is analyzed for every five image frames.

That is, the processor 120 may analyze only some of the plurality of image frames according to the analysis speed of the network model, thereby roughly analyzing all sections of the plurality of image frames according to a speed at which the plurality of image frames are sequentially photographed.

The processor 120 may identify the representative image frame based on the acquired degree of matching. Specifically, the processor 120 may acquire a score corresponding to the degree of matching by applying the selected image frames to the trained network model, and identify the representative image frame having the highest acquired score. Alternatively, the processor 120 may identify the representative image frame having the highest score among the image frames in which the acquired score is a predetermined threshold or more.

In this case, the threshold may be predetermined and/or may also be set according to a user command received through a user interface of the electronic apparatus 100. For example, if the user wants to be provided with an image of a friend laughing very loudly, the user may set the threshold to be relatively high through the user interface of the electronic apparatus 100.

In this case, the user interface includes a graphical user interface item such as a scroll bar displayed on a display of the electronic apparatus 100, while the threshold may be increased/decreased according to a user's touch or voice and the increased/decreased result may be displayed as a position of the scroll bar. However, the user interface is not limited thereto.

In addition, the processor 120 may acquire the degree of matching by applying image frames within a specific section including the identified representative image frame among the plurality of image frames to the trained network model. In this case, the processor 120 may identify the best image frame based on the acquired degree of matching and provide the identified best image frame.

Specifically, the processor 120 may acquire a score corresponding to the degree of matching by applying image frames within a specific section including the representative image frame to the trained network model, and may identify the image frame having the highest score among the acquired scores as the best image frame.

The specific section including the representative image frame may be predetermined. For example, the specific section including the representative image frame may be a section including image frames from an image frame photographed before the representative image frame by a predetermined time or number of frames to an image frame photographed after the representative image frame by a predetermined time or number of frames.

Meanwhile, the processor 120 may acquire a plurality of image frames of low quality by lowering the resolution of the plurality of image frames, and then use the same to identify the specific section described above.

In this case, the processor 120 may identify the representative image frame of low quality by applying image frames selected among the plurality of image frames of low quality to the learned network model. In addition, the processor 120 may identify the best image frame by applying image frames within the specific section including the representative image frame corresponding to the representative image frame of low quality among the plurality of image frames to the learned network model.

That is, the processor 120 may analyze the selected image frames with low quality in a process of finding the specific section including the best image frame, and may analyze each frame belonging to the corresponding section with higher quality than the preceding process in a process of identifying the best image frame in the corresponding section. As a result, the process of identifying the specific section including the best image frame while photographing the plurality of image frames may be performed, a relatively small number of image frames belonging to the identified section may be precisely analyzed in high quality, and the best image frame may be provided accurately and quickly as a high quality image.

However, the processor 120 may also find the specific section including the best image frame by analyzing the selected image frames among the plurality of image frames with low quality, and may also identify the best image frame by analyzing the image frames included in the corresponding section with low quality.

Figure 4:
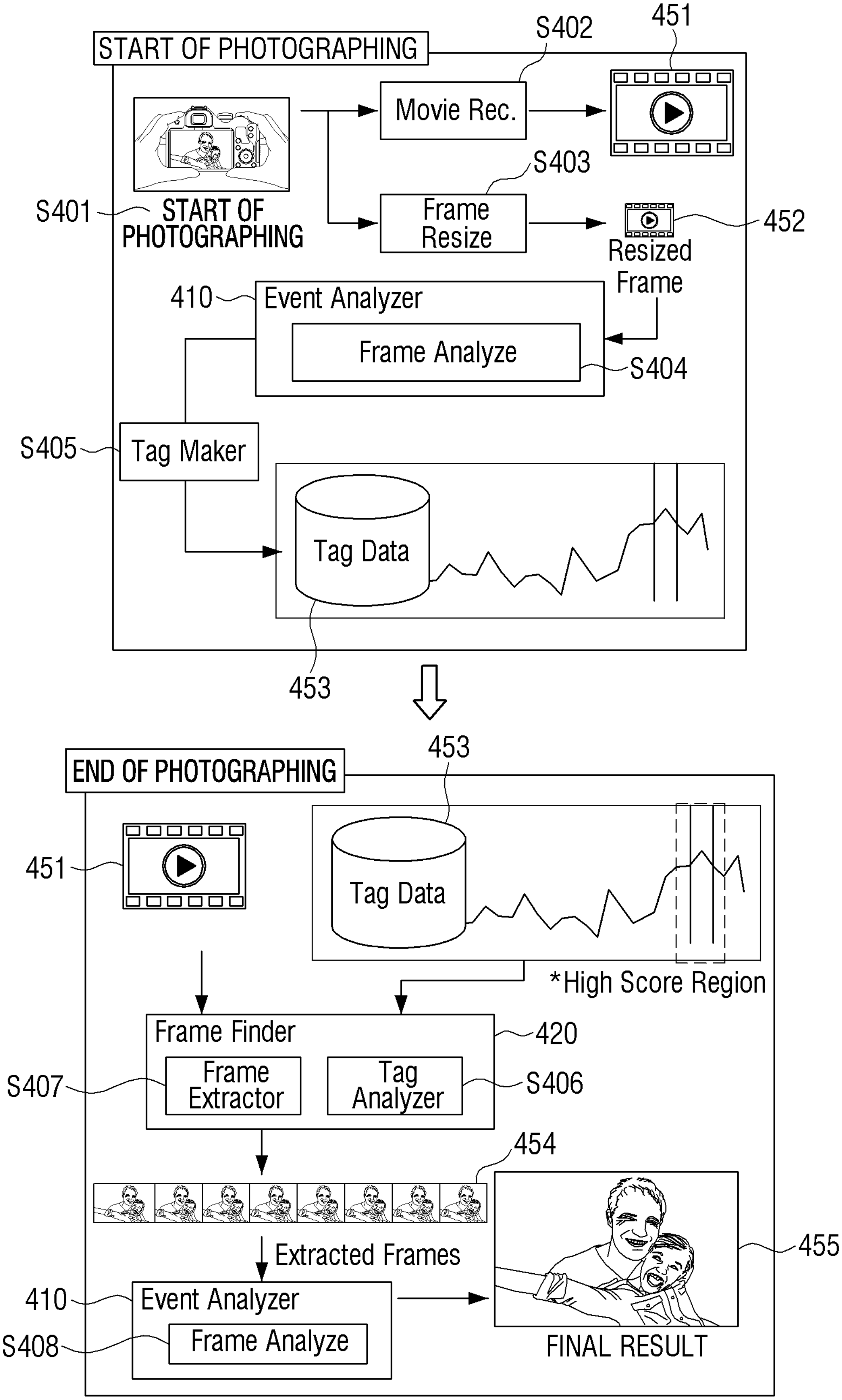
FIG. 4 is a diagram illustrating an example of finding a section including the best image frame by analyzing a plurality of image frames of low quality, and identifying the best image frame by analyzing frames included in the section in high quality.

FIG. 4 is a diagram illustrating an example of finding a section including the best image frame by analyzing at least a portion of a plurality of image frames of low quality, and identifying the best image frame by analyzing frames included in the section in high quality.

Referring to FIG. 4, when a photographing of a video, that is, a plurality of image frames, is started through the camera (operation S401), the processor 120 may record (operation S402) and store the plurality of image frames, that is, the video 451. In this case, the plurality of image frames may be photographed in high quality, and the video 451 may also be a plurality of image frames of high quality.

In addition, while the plurality of image frames are photographed, the processor 120 may reduce the resolution of each image frame to acquire a plurality of image frames 452 of low quality or of lower quality than the plurality of image frames 451 of high quality (operation S403).

In this case, at the same time the plurality of image frames are photographed, the plurality of image frames 452 of low quality may be sequentially displayed on a display of the electronic apparatus 100 and may be provided as a video, and as a result, the user may check a scene being viewed by the user through the camera 110, that is, a scene being photographed with a low quality.

In addition, the processor 120 may analyze selected image frames from among the plurality of image frames of low quality using an event analyzer 410 (operation S404). Specifically, while the plurality of image frames are photographed, the processor 120 may acquire, for each of the selected image frames, a score corresponding to the degree of matching by sequentially applying the selected image frames to the trained network model. The event analyzer 410 may be implemented as computer instructions and/or circuits stored in the memory 130, and may be included in the processor 120 or implemented separately from the processor 120 to be controlled.

In this case, the processor 120 may identify a frame having a score that is greater than or equal to the threshold and is the highest among the selected image frames as a representative image frame (of low quality). The processor 120 may acquire identification information of the representative image frame of low quality and/or a specific section including the representative image frame of low quality, that is, tag data 453 (operation S405). Further, the processor 120 may not store or may delete all of the image frames included in the remaining sections except the corresponding section, among the plurality of image frames of low quality. Alternatively, the processor 120 may use the plurality of image frames of low quality to only acquire the tag data 453, and may not store or may delete all of the plurality of image frames of low quality.

Referring to FIG. 4, the processor 120 applies the tag data 453 to a high quality video, that is, a plurality of image frames of high quality 451, using a frame finder 420 (operation S406), and may thus extract image frames (of high quality) 454 included in a section corresponding to the tag data 453 (operation S407). In this case, the processor 120 may delete all the image frames of high quality except the corresponding section, among the plurality of image frames of high quality 451. Meanwhile, the frame finder 420 may be implemented as computer instructions and/or circuits stored in the memory 130, and may be included in the processor 120 or implemented separately from the processor 120 to be controlled.

In addition, the processor 120 applies and analyzes the image frames of high quality 454 to the network model using the event analyzer 410 (operation S408), and may then identify a frame having the highest score from among the image frames 454 as the best image frame 455. In addition, the processor 120 may control the electronic apparatus 100 to provide the best image frame 455.

Meanwhile, referring to FIG. 4, it may be confirmed that the operations of extracting the image frames of high quality 454 using the tag data 453 and analyzing the extracted image frames of high quality 454 are performed after the photographing of the video is ended. However, if the tag data 453 is already acquired, the above-described operations may be started even before the photographing of the video is ended.

Figure 5A:
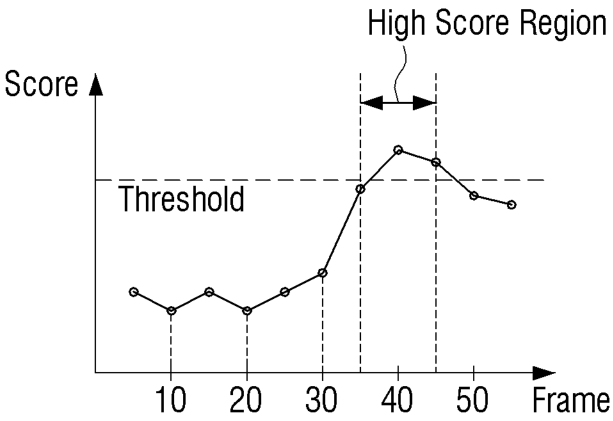
FIGS. 5A and 5B illustrate graphs illustrating an example of using a score of each image frame determined through a learned network model to identify the section including the best image frame and the best image frame'
Figure 5B:
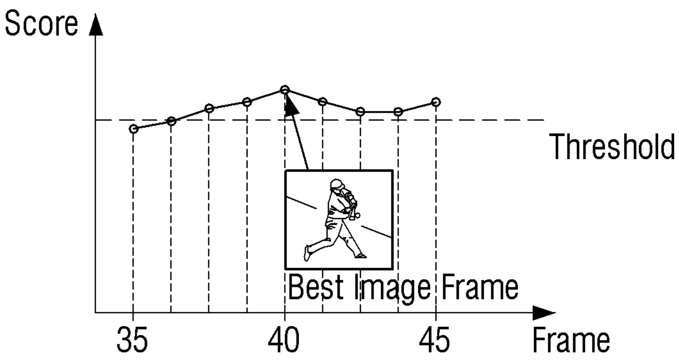

FIGS. 5A and 5B illustrate graphs illustrating an example of using a score of each image frame determined through a network model to identify the section including the best image frame and the best image frame.

FIG. 5A is a graph illustrating a process of identifying a section (e.g., high score region) including the best image frame and FIG. 5B is a graph illustrating a process of identifying the best image frame in the high score region. In FIGS. 5A and 5B, a horizontal axis is the order in which each image frame is photographed, and a vertical axis is a score acquired as a result of applying each image frame to the network model.

Referring to FIG. 5A, the processor 120 may acquire scores of image frames selected from the plurality of image frames while simultaneously photographing the plurality of image frames. In this case, the selected image frames may be image frames having a lower resolution than at the time of photographing.

It is assumed in FIG. 5A that the selected image frames are one image frame per every five image frames in the plurality of image frames, that is, the selected image frames are the fifth, tenth, fifteenth, . . . photographed image frames of the plurality of image frames. It is understood, however, that this is only an example and the selected image frames are not limited thereto.

Referring to FIG. 5A, when comparing the scores of the image frames of which the scores of the selected image frames are higher than a threshold, because a score of a 40th photographed image frame is highest, the processor 120 may identify the 40th photographed image frame as a representative image frame. In addition, the processor 120 may identify a section from the 35th photographed image frame to the 45th photographed image frame based on the representative image frame as a specific section (High Score Region) including the best image frame. However, in identifying the specific section based on the representative image frame, a range of the section may be variously predetermined.

Referring to FIG. 5B, the processor 120 may acquire each score by applying all image frames included in the high score region to the network model. In addition, the processor 120 may identify the 39th photographed image frame having the highest score as the best image frame. In this case, the processor 120 may analyze all image frames corresponding to the high score region in the same high quality as or corresponding to that at the time of photographing. As an example, the 40th photographed image frame is applied to the network model in FIG. 5A and to the network model in FIG. 5B, but may be applied in low quality in FIG. 5A and in high quality in FIG. 5B.

Meanwhile, the electronic apparatus 100 may provide a plurality of best image frames in one video photographing.

Here, the processor 120 may divide the plurality of image frames into a plurality of events based on the degree of matching of the selected image frames. In addition, the processor 120 may identify and provide the best image frame for each of the plurality of events. For example, while a video is being photographed, if a certain person in the video smiles, stops smiling, and then smiles again, the processor 120 may identify one best image frame among image frames corresponding to the moment of firstly smiling, and identify another best image frame among image frames corresponding to the moment of smiling again. Meanwhile, in the above-described example, although both events correspond to the same feature information (smiling person), the plurality of events may correspond to different feature information.

Specifically, when a score corresponding to the degree of matching of a first image frame from among the selected image frames is greater than or equal to a predetermined threshold, a score corresponding to the degree of matching of a second image frame photographed after the first image frame is less than the predetermined threshold, and a score corresponding to the degree of matching of a third image frame photographed after the second image frame is greater than or equal to the predetermined threshold, the processor 120 may determine that the first image frame and the third image frame correspond to different events.

Figure 6A:
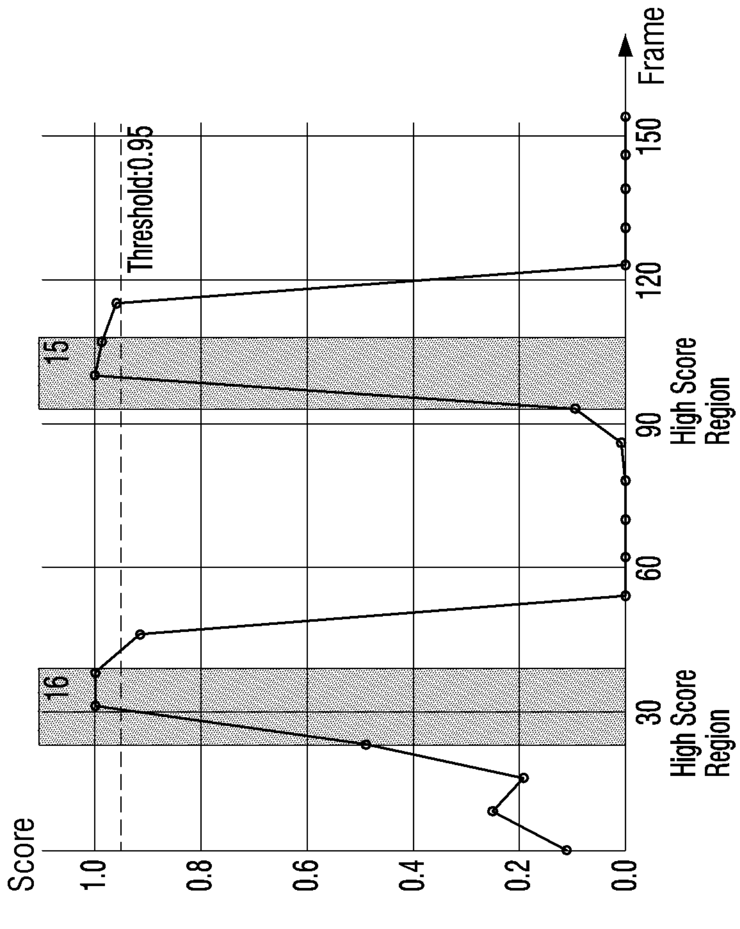
FIGS. 6A to 6C are graphs illustrating an example in which a plurality of best image frames is provided as a result of the plurality of image frames including a plurality of events.
Figure 6B:
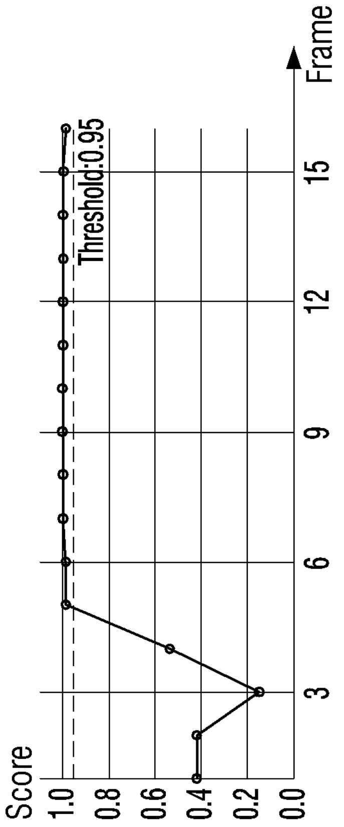
Figure 6C:
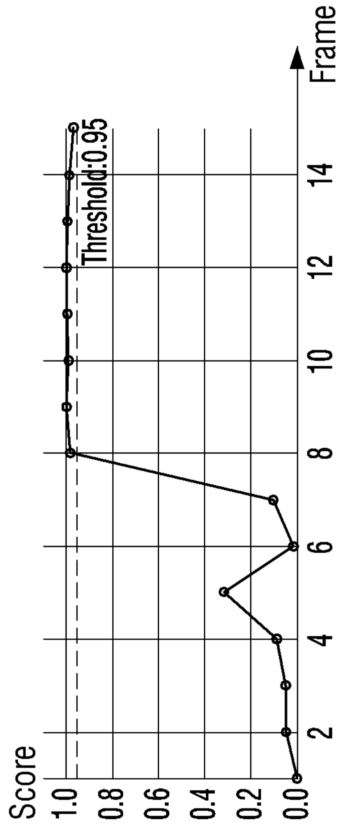

FIGS. 6A to 6C are graphs illustrating an example in which a plurality of best image frames are provided as a result of the plurality of image frames including a plurality of events.

FIG. 6A illustrates a score acquired as a result of applying the selected image frames among the plurality of image frames to the network model. A horizontal axis is the order in which each image frame is photographed, and a vertical axis is the score of each image frame.

Referring to FIG. 6A, it may be seen that a first high score region in which a score exceeds the threshold is identified near the 30th photographed image frame, the scores of the image frames photographed thereafter are less than the threshold, and a second high score region in which a score exceeds the threshold is identified near the 95th photographed image frame.

In addition, referring to FIG. 6B, as a result of analyzing the image frames belonging to the first high score region of high quality, a first best image frame having the highest score among the analyzed image frames may be identified.

In addition, referring to FIG. 6C, as a result of analyzing the image frames belonging to the second high score region of high quality, a second best image frame having the highest score among the analyzed image frames may be identified.

Meanwhile, when the predetermined number of events is identified, the processor 120 may control the camera 110 to end the photographing of the video. However, the end of the photographing of the video is not limited thereto. For example, the processor 120 may control the camera 110 to end the photographing of the video when a user command for ending the photographing is received or the photographing time of the video exceeds the predetermined time. In addition, the processor 120 may also control the camera 110 to end the photographing of the video when the number of frames of the plurality of image frames included in the photographed video exceeds a predetermined number.

Meanwhile, the processor 120 may delete image frames before the first image frame among the plurality of image frames when the score corresponding to the degree of matching of the first image frame among the selected image frames is less than the predetermined threshold, and identity the first image frame as the representative image frame when the score of the first image frame is greater than or equal to the predetermined threshold.

In this case, when the score of the first image frame is greater than or equal to the predetermined threshold and the score corresponding to the degree of matching of the second image frame following the first image frame among the selected image frames is greater than the score of the first image frame, the processor 120 may delete the image frames before the first image frame among the plurality of image frames and identify the second image frame as the representative image frame.

In this regard, FIGS. 7A to 7F are graphs illustrating an example of a specific process for finding a section including the best image frame in real time while the plurality of image frames constituting a video are photographed. In FIGS. 7A to 7F, frames that are sequentially analyzed are not all of the plurality of image frames, but selected image frames among the plurality of image frames.

It is assumed in FIGS. 7A to 7F that the range of the specific section (high score region) including the best image frame is determined based on two image frames photographed at the time most similar to the representative image frame (the image frame having the highest score among the selected image frames) among the image frames selected from the plurality of image frames.

Specifically, FIGS. 7A to 7F illustrate an example of an algorithm of finding a max score frame 702 among the selected frames, a start point frame 701 photographed at the time most similar to the max score frame 702 among the frames photographed before the max score frame 702, and an ending point frame 703 photographed at the time most similar to the max score frame 702 among the frames photographed after the max score frame 702.

Figures 7A, 7B, 7C, 7D, 7E, 7F:
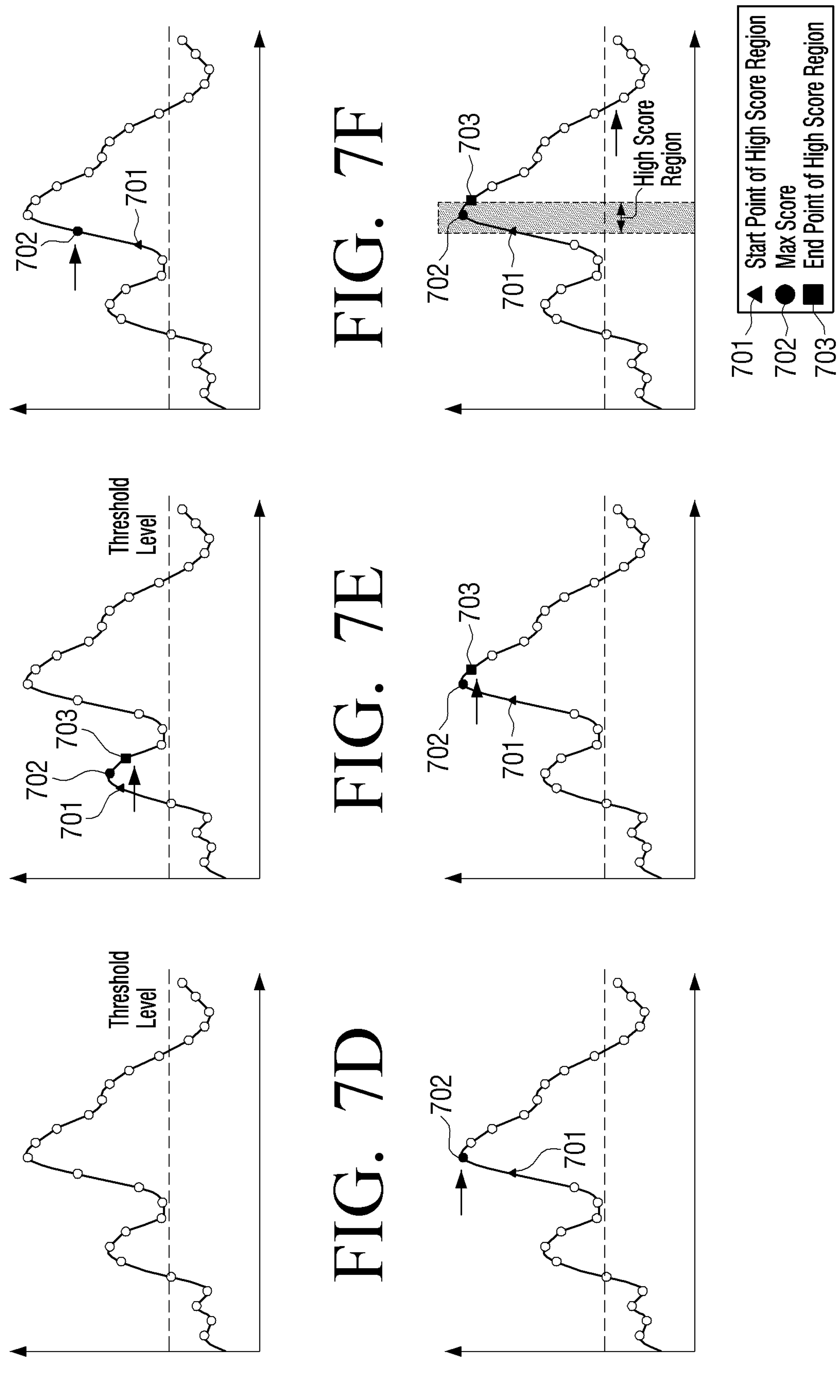
FIGS. 7A to 7F are graphs illustrating an example of a specific process for finding a section including the best image frame in real time while the plurality of image frames constituting a video are photographed.

Referring to FIG. 7A, the processor 120 may sequentially analyze the selected image frames according to the photographing order. In this case, as long as there is no image frame corresponding to the max score frame 702, image frames before the image frames whose scores do not reach a threshold level may not be stored at all or deleted even if they are stored.

If an image frame having a score that firstly exceeds the threshold level comes out (e.g., is captured or determined), the processor 120 may designate the corresponding image frame as the max score frame 702 and designate an image frame immediately before the corresponding image frame as the start point frame 701. In this case, if an image frame following the max score frame 702 is an image frame having a score that is less than that of the max score frame 702, the processor 120 may designate the image frame following the max score frame 702 as an end point frame 703.

However, if an image frame having a score greater than that of the max score frame 702 comes out after the max score frame 702, the processor 120 may newly designate the image frame having the greater score as the max score frame 702 and designate the image frame immediately before the max score frame 702 as the start point frame 701, as illustrated in FIG. 7B. In addition, if the image frame following the max score frame 702 is an image frame having a score that is less than that of the max score frame 702, the processor 120 may designate the image frame following the max score frame 702 as the end point frame 703.

Referring to FIGS. 7C to 7F, as a result of performing the above-described process for all of the selected image frames according to the photographing order of the selected image frames, the high score region may be identified based on the start point frame 701 and the end point frame 703 that are finally designated. As a result, the processor 120 may identify and provide the best image frame by applying all of the image frames included in the high score region from among the plurality of image frames to the network model in high quality.

Meanwhile, if the image frame having a score that is less than the threshold level comes out and the image frame having a score that is greater than or equal to the threshold level newly comes out in a state in which the start point frame 701 and the max score frame 702 are designated, the above-described processes may be repeated through FIGS. 7A to 7F to designate a new max score frame, a start point frame, and an end point frame included in an event separate from the previously designated max score frame 702.

Meanwhile, although the above-described embodiments discloses that only the selected image frames of the plurality of image frames are applied to the network model in the process of identifying the representative image frame, it is understood that one or more other embodiments are not limited thereto. For example, according to another embodiment, all of the plurality of image frames of low quality to the network model to identify the representative image frame.

Figure 8:
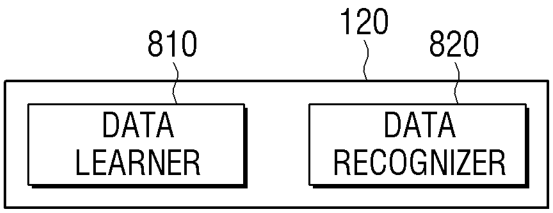
FIG. 8 is a block diagram illustrating an example of a configuration of a processor for training an artificial intelligence model and/or using a learned artificial intelligence model.

FIG. 8 is a block diagram illustrating an example of a configuration of the processor 120 for training an artificial intelligence model and/or using a learned artificial intelligence model.

Referring to FIG. 8, the processor 120 may include a data learner 810 and a data recognizer 820. According to another embodiment, the processor 120 may not include the data learner 810 and may include the data recognizer 820.

The data learner 810 (e.g., data trainer) may generate or train a network model to have a criterion for determining a predetermined situation (e.g., determining which feature information an input image matches primarily, how much is matched, and the like). The data learner 810 may generate a network model having a determination criterion by applying training data to the network model in order to determine the predetermined situation.

As an example, the data learner 810 may generate or train the network model using the feature information and the training data related to the plurality of images.

The data recognizer 820 may determine the situation based on recognition data. The data learner 820 may determine the situation from predetermined recognition data by using the learned network model. The data recognizer 820 may acquire the predetermined recognition data according to a predetermined criterion, and may determine (or estimate) the predetermined situation based on the predetermined recognition data by applying the acquired recognition data as an input value to the network model.

In addition, a resulting value output by applying the acquired recognition data to the network model as the input value may be used to update the network model.

As an example, the data recognizer 820 may acquire a determination result of which feature information the image corresponds to and/or the degree of matching to the corresponding feature information, by applying the recognition data related to one or more images to the network model as an input value.

At least a portion of the data learner 810 and at least a portion of the data recognizer 820 may be implemented as a software module or manufactured (or provided) in the form of at least one hardware chip and mounted in the electronic apparatus 100. For example, at least one of the data learner 810 or the data recognizer 820 may also be manufactured or provided in the form of a dedicated hardware chip for artificial intelligence (AI), or may be manufactured or provided as a portion of a related art general purpose processor (e.g., CPU or application processor) or a graphic dedicated processor (e.g., GPU) and mounted in the electronic apparatus 100. In this case, the dedicated hardware chip for artificial intelligence is a dedicated processor specialized in a probability calculation, and has higher parallel processing performance than the related art general purpose processor, so it may quickly process calculation operations in an artificial intelligence field such as machine learning. When the data learner 810 and the data recognizer 820 are implemented as a software module (or a program module including instructions), the software module may be stored in a non-transitory computer readable medium. In this case, the software module may be provided by an operating system (OS), or may be provided by a predetermined application. Alternatively, some of the software modules may be provided by the operating system (OS), and the remaining of the software modules may be provided by the predetermined application.

The data learner 810 and the data recognizer 820 may be mounted in the electronic apparatus 100 or may be mounted in the electronic apparatus 100 and an external device, respectively. For example, one of the data learner 810 and the data recognizer 820 may be included in the electronic apparatus 100, and the other may be included in an external server. In addition, the data learner 810 and the data recognizer 820 may also provide model information constructed by the data learner 810 to the data recognizer 820 by a wired or wireless line, and the data input to the data recognizer 820 may also be provided to the data learner 810 as additional training data.

Figure 9A:
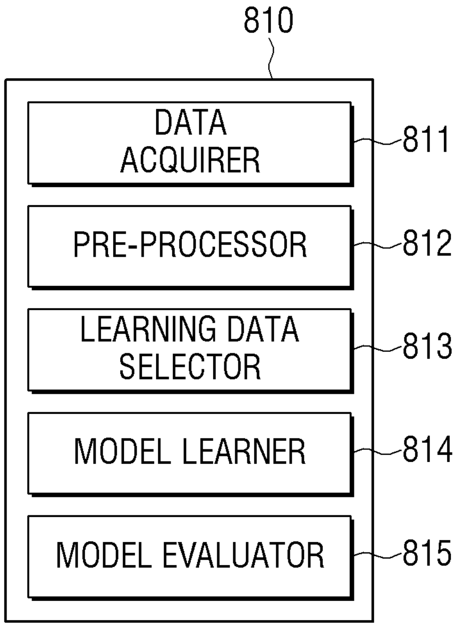
FIGS. 9A and 9B are block diagrams illustrating in more detail configurations of a data learner and a data recognizer included in the processor in FIG. 8.
Figure 9B:
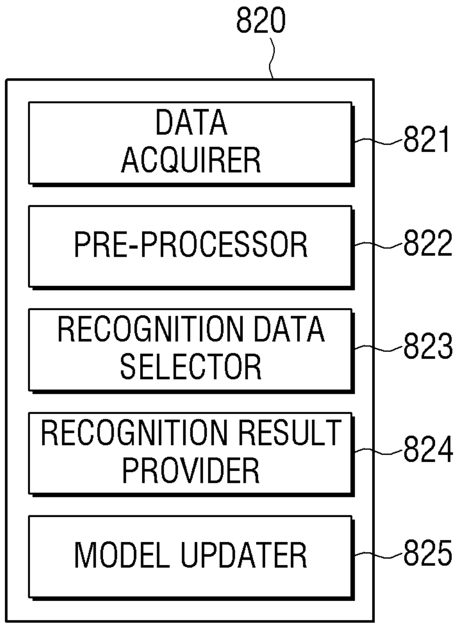

FIGS. 9A and 9B are block diagrams illustrating in more detail configurations of the data learner 810 and the data recognizer 820 included in the processor 120 in FIG. 8.

FIG. 9A is a block diagram illustrating an example of a configuration of the data learner 810. Referring to FIG. 9A, the data learner 810 may include a data acquirer 811 and a model learner 814 (e.g., model trainer). In addition, the data learner 810 may selectively further include at least one of a pre-processor 812, a learning data selector 813 (e.g., training data selector), or a model evaluator 815.

The data acquirer 811 may acquire data for (e.g., necessary for) training for situation determination.

The training data may be data collected or tested by the data learner 810 or a manufacturer of the electronic apparatus 100. As an example, the training data may be data about one or more predetermined feature information and a plurality of images.

The model learner 814 may train the network model to have a determination criterion regarding how the network model determines a predetermined situation using the training data. For example, the model learner 814 may train the network model through supervised training using at least a portion of the training data as the determination criterion. Alternatively, the model learner 814 may train the network model through unsupervised training of finding the determination criterion for determining a situation by performing self-training using the training data without any supervision, for example.

In addition, the network model may be trained on a selection criterion about what training data to use for situation determination through the model learner 814. For example, in order to determine the degree of matching between each feature information and the image, the criterion for which attribute of the image should be mainly used for each feature information may be trained.

When the network model is trained through the supervised model, as a determination criterion, resources that are analysis targets and execution resources for executing a specific function may be added as training data.

Meanwhile, the network model may be a model that is previously built and updated by training of the model learner 814. In this case, the network model may be built in advance by receiving basic training data (e.g., a sample image or the like).

According to various embodiments, when there are a plurality of pre-built network models, the model learner 814 may determine a network model having a great relation between the input training data and the basic training data as the network model to be trained. In this case, the basic training data may be pre-classified for each type of data, and the network model may be pre-built for each type of data. For example, the basic training data may be a plurality of images classified as training targets for each feature information.

In addition, the model learner 814 may train the network model using a training algorithm or the like including, for example, error back-propagation or gradient descent.

In addition, the model learner 814 may train the network model through reinforcement training using a feedback as to whether a result of the situation determination according to the training is correct, for example.

In addition, when the network model is trained, the model learner 814 may store the trained network model. In this case, the model learner 814 may store the trained network model in the memory 130 of the electronic apparatus 100. Alternatively, the model learner 814 may store the trained network model in a memory of a server connected to the electronic apparatus 100 via a wired or wireless network.

The data learner 810 may further include a pre-processor 812 and a learning data selector 813 (e.g., training data selector) to improve a recognition result of the network model or to save resources or time required for generation of the network model.

The pre-processor 812 may pre-process the data acquired by the data acquirer 811 for use in training for situation determination.

For example, the pre-processor 812 may process the acquired data into a predefined format so that the model learner 814 may easily use the data for training the network model. Here, the pre-processor 812 may process the video data acquired by the data acquirer 811 into video data of a predetermined format. The preprocessed data may be provided to the model learner 814 as the training data.

Alternatively, the learning data selector 813 may selectively select training data for (e.g., necessary for) training from the preprocessed data. The selected training data may be provided to the model learner 814. The learning data selector 813 may select training data for (e.g., necessary for) training among the preprocessed data according to a predetermined selection criterion. In addition, the training data selector 813 may also select the training data for (e.g., necessary for) training according to a selection criterion predetermined by the model learner 814. By way of example, the learning data selector 813 may select only an area including a person except a background from the input video data.

The data learner 810 may further include the model evaluator 815 to improve the recognition result of the network model.

The model evaluator 815 may input evaluation data to the network model and may cause the model learner 814 to train again when the recognition result outputted from the evaluation data does not satisfy a predetermined criterion. In this case, the evaluation data may be predefined data for evaluating the network model.

For example, when the number or ratio of the evaluation data in which the recognition result is not correct among the recognition results of the trained recognition model for the evaluation data exceeds a predetermined threshold value, the model evaluator 815 may evaluate or determine that the predetermined criterion is not satisfied. For example, in a case in which the predetermined criterion is defined as a ratio of 2%, if the trained network model outputs incorrect recognition results for more than 20 evaluation data among a total of 1000 evaluation data, the model evaluator 815 may evaluate or determine that the trained network model is not suitable.

Meanwhile, when a plurality of trained network models exist, the model evaluator 815 may evaluate whether each of the trained network models satisfies the predetermined criterion, and determine a model that satisfies the predetermined criterion as a final network model. In this case, when a plurality of models that satisfy the predetermined criterion exist, the model evaluator 815 may determine any one or a predetermined number of models that are previously set in descending order of evaluation score as the final network model.

At least one of the data acquirer 811, the pre-processor 812, the learning data selector 813, the model learner 814, and the model evaluator 815 described above may be implemented as a software module or manufactured (or provided) in the form of at least one hardware chip and mounted in the electronic apparatus 100. For example, at least one of the data acquirer 811, the pre-processor 812, the learning data selector 813, the model learner 814, or the model evaluator 815 may also be manufactured or provided in the form of a dedicated hardware chip for artificial intelligence (AI), or may be manufactured as a portion of an existing general purpose processor (e.g., CPU or application processor) or a graphic dedicated processor (e.g., GPU) and mounted in a variety of electronic apparatuses described above.

In addition, the data acquirer 811, the pre-processor 812, the learning data selector 813, the model learner 814, and the model evaluator 815 may also be mounted in one electronic apparatus 100, or may be mounted in separate electronic apparatuses, respectively. For example, some of the data acquirer 811, the pre-processor 812, the learning data selector 813, the model learner 814, and the model evaluator 815 may be included in the electronic apparatus 100, and the remaining may be included in the server.

In addition, at least one of the data acquirer 811, the pre-processor 812, the learning data selector 813, the model learner 814, or the model evaluator 815 may be implemented as a software module. When at least one of the data acquirer 811, the pre-processor 812, the learning data selector 813, the model learner 814, or the model evaluator 815 is implemented as the software module (or a program module including instructions), the software module may be stored in a non-transitory computer readable medium. In addition, in this case, at least one software module may be provided by an operating system (OS), or may be provided by a predetermined application. Alternatively, some of at least one software module may be provided by the operating system (OS), and the remaining of the software module may be provided by the predetermined application.

FIG. 9B is a block diagram illustrating an example of a configuration of the data recognizer 820 according to an embodiment. Referring to FIG. 9B, the data recognizer 820 may include a data acquirer 821 and a recognition result provider 824. In addition, the data recognizer 820 may selectively further include at least one of a pre-processor 822, a recognition data selector 823, or a model updater 825.

The data acquirer 821 may acquire data for (e.g., necessary for) situation determination.

The recognition result provider 824 may determine a situation by applying the data acquired by the data acquirer 821 to the learned network model as an input value. The recognition result provider 824 may provide a recognition result according to a recognition purpose of the data. For example, when the acquired data is a specific image, the recognition result provider 824 may provide a result of determining the corresponding image matches to which feature information among the predetermined feature information or how much the corresponding image matches thereto.

The recognition result provider 824 may provide a recognition result acquired by applying data that is pre-processed by a pre-processor 822 (described below) to the trained network model as an input value. Alternatively, the recognition result provider 824 may provide the recognition result by applying data selected by a recognition data selector 823 (described below) to the network model as an input value.

The data recognizer 820 may further include a pre-processor 822 and a recognition data selector 823 to improve the recognition result of the network model or to save resources or time for (e.g., required for) providing the recognition result.

The pre-processor 822 may pre-process the data acquired by the data acquirer 821 for use in recognizing for situation determination.

The pre-processor 822 may process the acquired data into a predefined format so that the recognition result provider 824 may easily use the data for situation determination. In particular, according to an embodiment, the data acquirer 821 may acquire video data to determine the degree of matching with the feature information, and the pre-processor 822 may pre-process the video data into the predefined format.

The recognition data selector 823 may select recognition data for (e.g., necessary for) situation determination among the pre-processed data. The selected recognition data may be provided to the recognition result provider 824. The recognition data selector 823 may select recognition data for (e.g., necessary for) situation determination among the pre-processed data according to a predetermined selection criterion. In addition, the recognition data selector 823 may also select the data according to a predetermined selection criterion by training by the model learner 814.

The model updater 825 may control the network model to be updated based on the evaluation for the recognition result provided by the recognition result provider 824. For example, the model updater 825 may control the model learner 814 to update the network model by providing the recognition result provided by the recognition result provider 824 to the model learner 814.

At least one of the data acquirer 821, the pre-processor 822, the recognition data selector 823, the recognition result provider 824, or the model updater 825 in the data recognizer 820 described above may be implemented as a software module or manufactured (or provided) in the form of at least one hardware chip and mounted in the electronic apparatus 100. For example, at least one of the data acquirer 821, the pre-processor 822, the recognition data selector 823, the recognition result provider 824, or the model updater 825 may also be manufactured in the form of a dedicated hardware chip for artificial intelligence (AI), or may be manufactured as a portion of a related art general purpose processor (e.g., CPU or application processor) or a graphic dedicated processor (e.g., GPU) and mounted in a variety of electronic apparatuses described above.

In addition, the data acquirer 821, the pre-processor 822, the recognition data selector 823, the recognition result provider 824, and the model updater 825 may also be mounted in one electronic apparatus 100, or may also be mounted in separate electronic apparatuses, respectively. For example, some of the data acquirer 821, the pre-processor 822, the recognition data selector 823, the recognition result provider 824, and the model updater 825 may be included in the electronic apparatus 100, and the remaining may be included in the server.

In addition, at least one of the data acquirer 821, the pre-processor 822, the recognition data selector 823, the recognition result provider 824, or the model updater 825 may be implemented as a software module. When at least one of the data acquirer 821, the pre-processor 822, the recognition data selector 823, the recognition result provider 824, or the model updater 825 is implemented as the software module (or a program module including instructions), the software module may be stored in a non-transitory computer readable medium. In addition, in this case, at least one software module may be provided by an operating system (OS), or may be provided by a predetermined application. Alternatively, some of at least one software module may be provided by the operating system (OS), and the remaining of the software module may be provided by the predetermined application.

Figure 10:
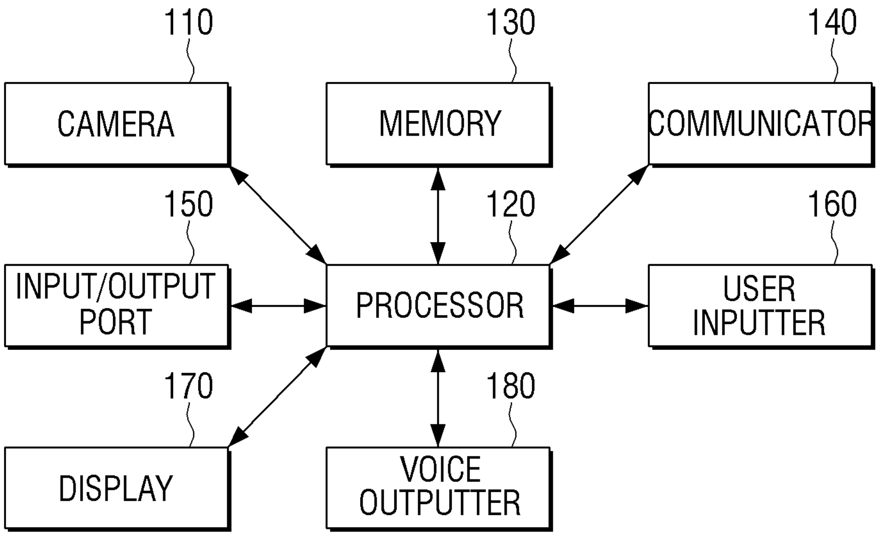
FIG. 10 is a block diagram illustrating a detailed configuration of an electronic apparatus according to an embodiment.

FIG. 10 is a block diagram illustrating a detailed configuration of the electronic apparatus 100 according an embodiment.

Referring to FIG. 10, the electronic apparatus 100 may further include at least one of a communicator 140, an input/output port 150, a user inputter 160, a display 170, or a voice outputter 180, in addition to the camera 110, the processor 120, and the memory 130.

The communicator 140 is configured to perform data communication with an external device by wireless and/or wired line. The processor 120 may perform communication with various external devices using the communicator 140.

When the data communication is performed with the external device using a wireless communication method, the communicator 140 may include at least one of a Wi-Fi direction communication module (e.g., interface, circuitry, etc.), a Bluetooth module, an infrared data association (IrDA) module, a near field communication (NFC) module, a Zigbee module, a cellular communication module, a 3rd generation (3G) mobile communication module, a 4th generation (4G) mobile communication module, or a 4th generation Long Term Evolution (LTE) communication module.

When the data communication is performed with the external device using a wired communication method, the communicator 140 may be connected to a coaxial cable, an optical fiber cable, or the like to transmit and receive various data by performing local area network (LAN) communication.

The processor 120 may transmit and receive data with respect to one or more images or videos with an external device through the communicator 140.

The electronic apparatus 100 may receive data for the plurality of image frames from the outside through the communicator 140, and identify the best image frame from among the plurality of image frames. In addition, the electronic apparatus 100 may also transmit data for the best image frame to an external device through the communicator 140.

For example, when the electronic apparatus 100 is implemented as a mobile phone or a smartphone to communicate with an external device that is a server through the communicator 140, the electronic apparatus 100 may receive video data including one or more image frames from the external device that is the server, and may also identify the best image frame among the plurality of image frames included in the corresponding video.

Meanwhile, the communicator 140 may separately include a first communicator for transmitting and receiving data with a remote control device for controlling the electronic apparatus 100 and a second communicator for transmitting and receiving data with an external server. In this case, the first communicator may be implemented as an Ethernet modem, a Wi-Fi module, a Bluetooth module, an Infrared receiver, an RF receiver, or the like, while the second communicator may also be implemented as a separate Wi-Fi module or an Ethernet module.

The electronic apparatus 100 may receive a signal/data for an image from the outside or transmit data/signal for the image to the outside through the input/output port 150.

To this end, the input/output port 150 may be implemented as a wired port such as an HDMI port, a display port, an RGB port, a VGA port, a digital visual interface (DVI) port, a thunderbolt and a component port, or the like.

The input/output port 150 may be implemented as the HDMI port or the thunderbolt to transmit image and voice signals together, but may also have a first port for transmitting the image signal and a second port for transmitting the voice signal that are separately implemented.

The input/output port 150 may include an interface module such as universal serial bus (USB), and may be physically connected to an external terminal device such as a PC through such an interface module to transmit and receive voice or image data or to transmit and receive firmware data for performing a firmware upgrade.

The electronic apparatus 100 may receive data for the plurality of image frames from the outside through the input/output port 150, and identify the best image frame among the plurality of image frames. In addition, the electronic apparatus 100 may also transmit data for the best image frame to an external device through the input/output port 150.

Meanwhile, as described above, in the case in which the data for the video, that is, the data for the plurality of image frames, may be received from the outside through the communicator 140 or the input/output port 150, even if the electronic apparatus 100 does not directly photograph the plurality of image frames, the electronic apparatus 100 may acquire the data for the plurality of image frames, and therefore, unlike FIG. 2, the electronic apparatus 100 may not include the camera 110. In addition, the same applies to a case in which the electronic apparatus 100 includes a broadcast receiver. This may correspond to a case in which a user photographs a video through a camera provided in an external device that is wired/wirelessly connected to the electronic apparatus 100.

The user inputter 160 is a component that enables the electronic apparatus 100 to receive a user input including a command or information from the user.

The electronic apparatus 100 may receive a user input for starting or ending the photographing of the video through the user inputter 160. In addition, the electronic apparatus 100 may also receive a user input for adjusting a threshold to be compared with the scores of selected image frames, through the user inputter 160.

The user inputter 160 may also include one or more buttons, a keyboard, a mouse, and the like for receiving the user input. The user inputter 160 may include a touch panel or a separate touch pad implemented together with the display 170 to receive the user input in a touch form.

The user inputter 160 may also include a microphone to receive a user input corresponding to the command for starting/ending the photographing by voice.

The display 170 is a component for displaying one or more images under the control of the processor 120. To this end, the display 170 may be implemented as a liquid crystal display (LCD), a plasma display panel (PDP), organic light emitting diodes (OLED), a transparent OLED (TOLED), or the like. When the display 170 is implemented as the LCD, the display 170 also includes a driving circuit, a backlight unit, and the like, which may be implemented in the form of an a-si thin film transistor (TFT), a low temperature poly silicon (LTPS) TFT, an organic TFT (OTFT), or the like.

Meanwhile, the display 170 may be implemented in the form of a touch screen including a touch panel capable of detecting a touch manipulation of the user. In this case, the display 170 may be considered to be included in the user inputter 160.

The processor 120 may control the display 170 to display the photographed video while simultaneously photographing the video through the camera 110. Specifically, the processor 120 may control the display 170 to display a low quality video having a lower resolution of the photographed video (a plurality of image frames).

In addition, the processor 120 may control the display 170 to display one or more best image frames identified among the plurality of image frames.

The voice outputter 180 is a component for outputting a specific voice under the control of the processor 120. The voice outputter 180 may be implemented as a speaker 190 and/or a headphone/earphone output terminal.

The processor 120 may control the voice outputter 180 to provide a guide for video photographing in a voice form.

Hereinafter, a controlling method of an electronic apparatus according to one or more embodiments will be described with reference to FIGS. 11 to 14.

Figure 11:
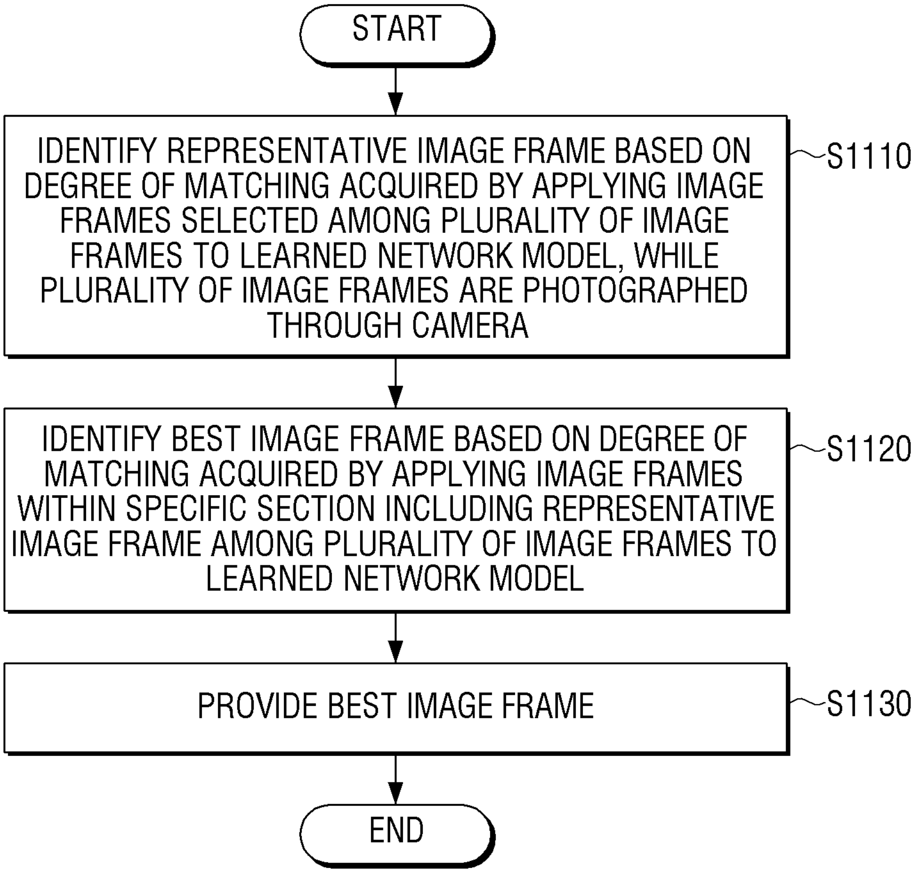
FIG. 11 is a flowchart illustrating a controlling method of an electronic apparatus according to an embodiment.

FIG. 11 is a flowchart illustrating a controlling method of an electronic apparatus according to an embodiment. The electronic apparatus may include a memory in which a network model trained to determine a degree of matching between an input image frame and predetermined feature information is stored when the image frame is input.

Referring to FIG. 11, according to the controlling method, while a plurality of image frames are photographed by a camera, a representative image frame may be identified based on a degree of matching acquired by applying image frames selected among the plurality of image frames to a trained network model (operation S1110). In this case, the selected image frames may be image frames photographed at constant time intervals determined based on a determination speed of the trained network model. However, the selected image frames are not limited thereto and the time interval may not be constant in one or more other embodiments. It is understood, however, that all of the plurality of image frames may not be analyzed (applied to the network model) in operation S1110.

Specifically, a score corresponding to the degree of matching may be acquired by applying the selected image frames to the trained network model, and the representative image frame having the highest score may be identified among the image frames in which the acquired score is a predetermined threshold or more.

In addition, the best image frame may be identified based on the degree of matching acquired by applying image frames within a specific section including the identified representative image frame among the plurality of image frames to the trained network model (operation S1120).

Specifically, a score corresponding to the degree of matching may be acquired by applying the image frames within the above-described specific section including the representative image frame to the trained network model, and the best image frame having the highest score among the acquired scores may be identified.

In addition, the identified best image frame may be provided (operation S1130). In this case, the best image frame may be stored in a memory of the electronic apparatus, data for the best image frame may be transmitted to an external device, or the best image frame may be displayed.

Meanwhile, in FIG. 11, the process (operation S1110) of identifying the representative image frame may be performed in a low quality analysis, and the process (operation S1120) of identifying the best image frame may be performed in a high quality analysis as compared to the process (operation S1110).

Figure 12:
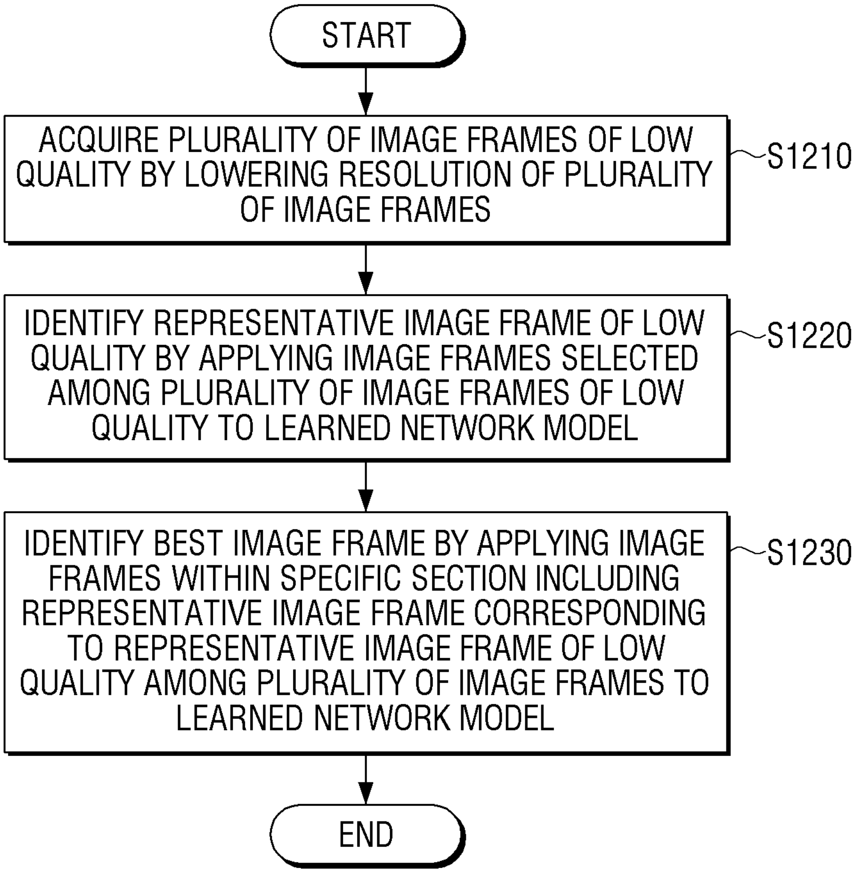
FIG. 12 is a flowchart illustrating an example for finding a section including the best image frame by analyzing the plurality of image frames in low quality.

In this regard, FIG. 12 is a flowchart illustrating an example for finding a section including the best image frame by analyzing the plurality of image frames in low quality.

Referring to FIG. 12, according to the controlling method, a plurality of image frames of low quality may be acquired by lowering resolution of the plurality of image frames (operation S1210). In this case, the plurality of image frames of low quality may be displayed at the same time as the acquisition and provided as a video.

In addition, a representative image frame of low quality may be identified by applying image frames selected among the plurality of image frames of low quality to the trained network model (operation S1220). In this case, the selected image frames may be image frames selected at time intervals determined according to a determination speed of the network model.

In addition, the best image frame may be identified by applying image frames within a specific section including the representative image frame corresponding to the representative image frame of low quality among the plurality of image frames to the trained network model (operation S1230). In this case, the image frames within the section including the representative image frame may be higher quality than the plurality of image frames of low quality. In addition, the finally identified best image frame may also be higher quality than the plurality of image frames of low quality.

Meanwhile, the process (operation S1110) of identifying the representative image frame in FIG. 11 may include the following operations.

Specifically, when a score corresponding to a degree of matching of a first image frame among the selected image frames is less than the predetermined threshold, image frames before the first image frame among the plurality of image frames may be deleted. Meanwhile, when the score of the first image frame is greater than or equal to the predetermined threshold, the first image frame may be identified as the representative image frame.

In this case, when the score of the first image frame is greater than or equal to the predetermined threshold and a score corresponding to a degree of matching of a second image frame following the first image frame from among the selected image frames is greater than the score of the first image frame, the image frames before the first image frame among the plurality of image frames may be deleted and the second image frame may be identified as the representative image frame.

Figure 13:
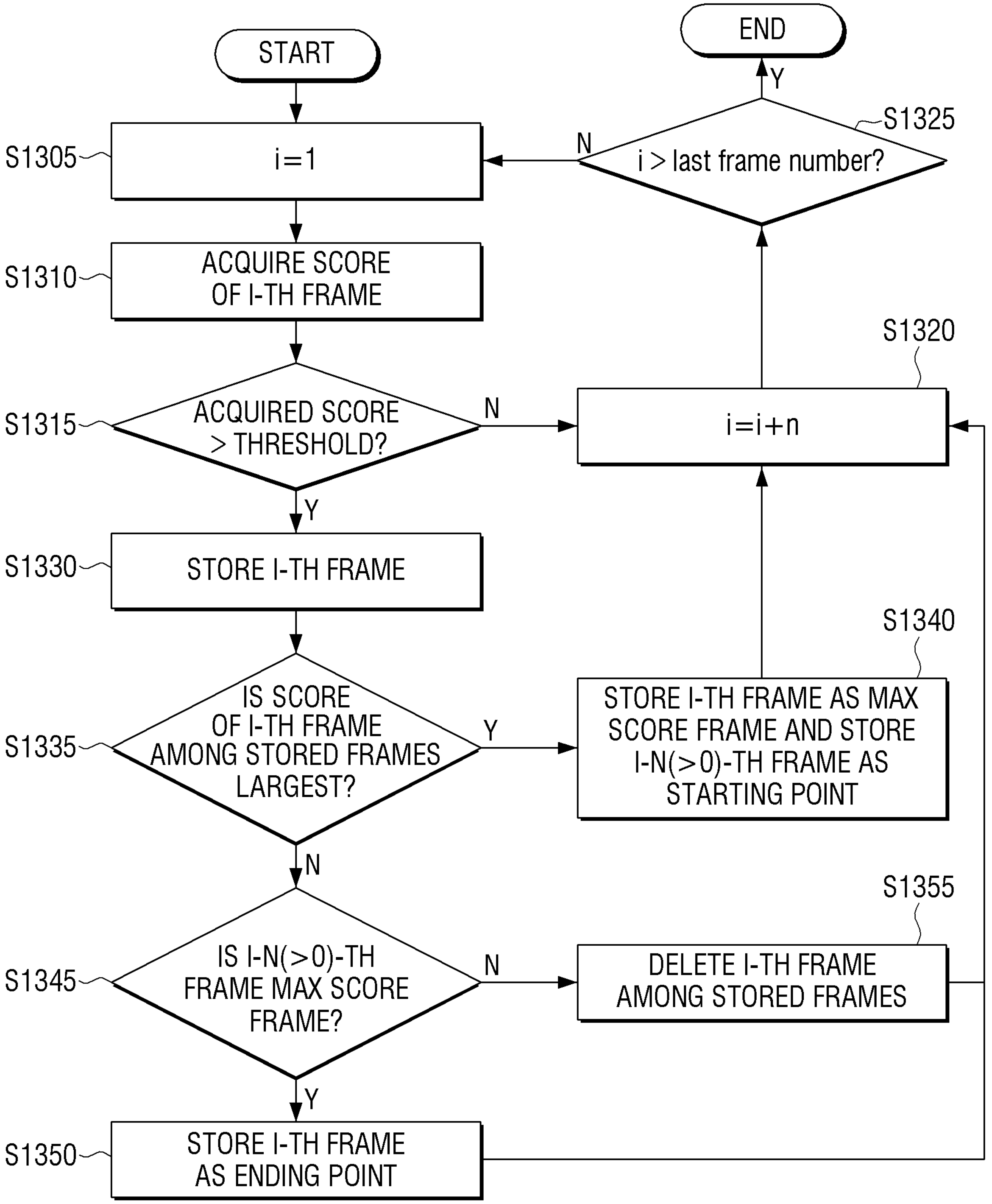
FIG. 13 is an algorithm illustrating an example of a specific process for finding a section including the best image frame in real time while the plurality of image frames constituting a video are photographed.

In this regard, FIG. 13 illustrates an algorithm illustrating an example of a specific process of identifying the representative image frame (max score frame) among the selected image frames by analyzing the selected image frames in real time while the plurality of image frames constituting the video are photographed, and finding a section including the best image frame based on the representative image frame.

Referring to FIG. 13, a score may be acquired by first applying an i-th (from i=1) photographed image frame to the network model (operations S1305 and S1310).

If the score of the i-th image frame is greater than the threshold (Y in S1315), the i-th image frame may be stored (S1330). In this case, tag data of the i-th image frame may also be stored.

In addition, it may be identified whether the score of the i-th image frame is the largest among the stored frames (operation S1335).

If the score of the i-th image frame is the largest (Y in operation S1335), the i-th image frame may be designated as the max score frame, and an 'I–n'-th image frame may be stored as a starting point (operation S1340). However, when the i-th image frame is a first image frame to be analyzed among the selected frames (in FIG. 13, when i=1), the 'i–n'-th image frame does not exist and therefore, it is only necessary to designate the i-th image frame as the max score frame.

If the score of the i-th image frame is not the largest (N in operation S1335), it may be identified whether the 'I–n'-th image frame is the max score frame (operation S1345). In this case, if the 'i–n'-th image frame is currently the max score frame (Y in operation S1345), the i-th frame may be designated as an ending point (operation S1350). On the other hand, if the 'i–n'-th image frame is not currently the max score frame (N in operation S1345), the stored i-th frame may be deleted (operation S1355). In this case, the tag data for the i-th frame may be deleted.

As such, if one of N in operations S1315, S1340, S1355, and S1350 is performed for the i-th image frame, the above-described processes may be performed on an 'i+n'-th image frame that is an image frame photographed after the i-th image frame among the selected image frames (operations S1320-S1325-S1310-~~~). However, when the order of the last photographed image frame is smaller than 'i+n' (Y in S1325), that is, when the photographing is ended, the analysis of the selected image frames may be ended. In this case, 'n' may be a predetermined number of frames according to an analysis speed of the network model and a photographing interval of the plurality of image frames. For example, in the case of FIG. 3 described above, 'n' is '5'.

When the starting point and the ending point are finally determined through the processes as illustrated in FIG. 13, the best image frame may be identified by analyzing all the image frames within a section set based on the starting point and the ending point.

It is understood, however, that the operation of identifying the section to which the best image frame belongs is not limited to the embodiment of FIG. 13 using the starting point and the ending point before and after the max score frame, but various algorithms may be used.

Meanwhile, in the controlling method, the plurality of images may be divided into a plurality of events based on the degree of matching of the selected image frames, and the best image frame may also be identified for each of the plurality of divided events.

In this case, when a score corresponding to the degree of matching of a first image frame among the selected image frames is a predetermined threshold or more, a score corresponding to the degree of matching of a second image frame photographed after the first image frame is less than the predetermined threshold, and a score corresponding to the degree of matching of a third image frame photographed after the second image frame is the predetermined threshold or more, it may be determined that the first image frame and the third image frame correspond to different events.

Figure 14:
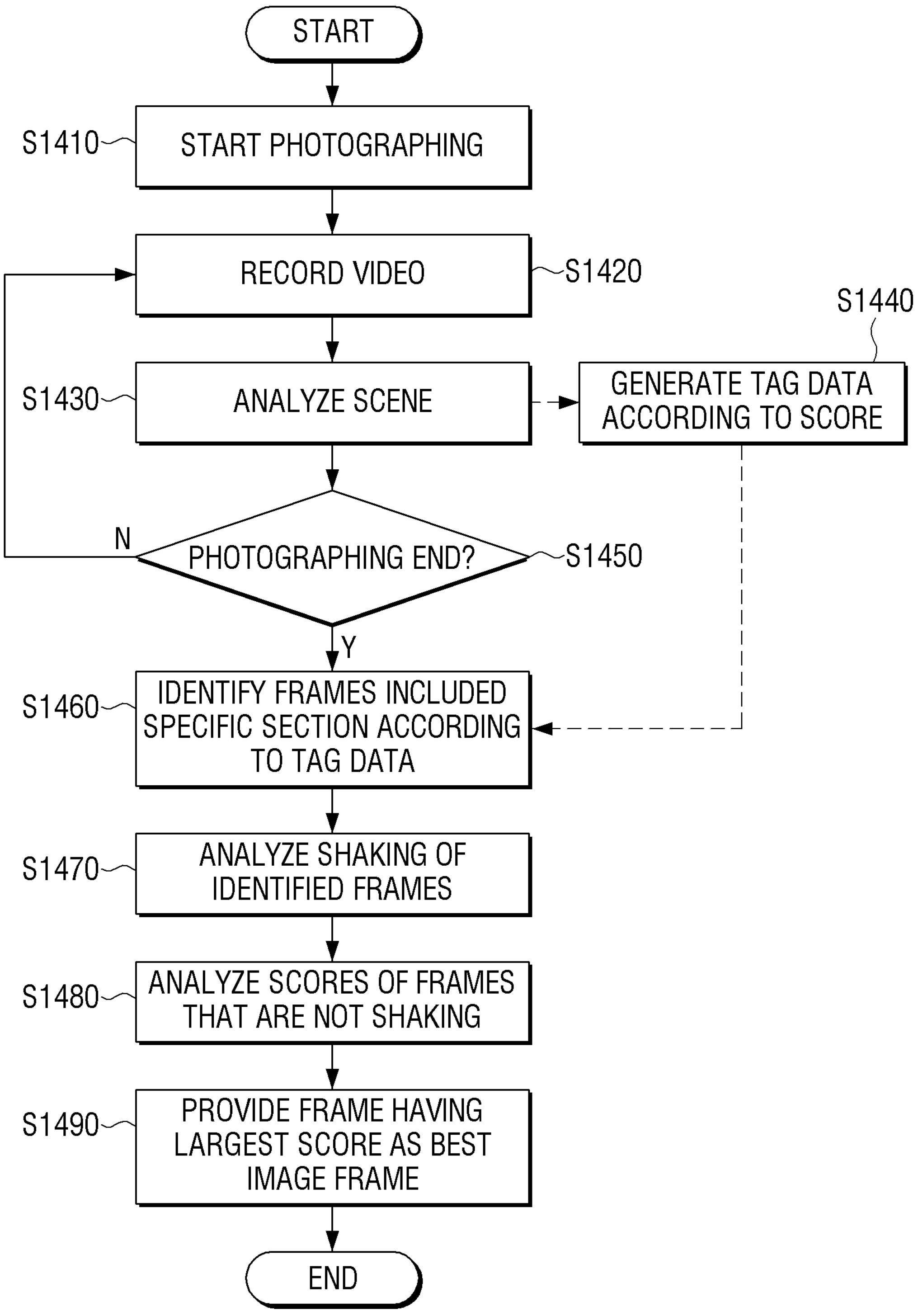
FIG. 14 is an algorithm illustrating an example of an overall process from the starting of the photographing of the video to the providing of the best image frame.

Meanwhile, unlike FIG. 13 in which only the process of identifying the section including the best image frame is described specifically, FIG. 14 is an algorism illustrating an example of an entire process from a starting of photographing of the video to providing of the best image frame.

Referring to FIG. 14, when photographing of the video starts (operation S1410), recording of the video is performed (operation S1420). Specifically, a plurality of image frames included in the video may be stored, and in this case, the user may not be notified that the recording of the image is performed. In this case, a plurality of image frames of a photographed high quality video that is recorded and a plurality of image frames of low quality having resolution lower than the high quality video may also be separately stored.

In addition, a scene analysis for the video may be performed (operation S1430). Specifically, a score indicating a degree to which each of the selected image frames matches the feature information may be acquired by applying the selected image frames of the plurality of image frames to the network model. In this case, the selected image frames may be image frames of low quality.

Such a process (operation S1430) may be sequentially performed for each of the selected image frames in the photographing order until the photographing is ended (operation S1450).

Meanwhile, as a result of acquiring the score of each of the selected image frames, tag data according to the score may be generated (operation S1440). In this case, the tag data may include identification information of the representative image frame having the highest score (when the score is larger than the threshold) among the selected image frames.

In addition, frames included in a specific section may be identified according to the tag data (operation S1460). Specifically, among the plurality of image frames included in the recorded (high quality) image, image frames belonging to a section including the representative image frame corresponding to the tag data may be identified.

Thereafter, image frames having a shaking degree less than a predetermined value are analyzed among the identified image frames (operations S1470 and S1480), and the best image frame having the largest score among the analyzed image frames may be identified and provided (operation S1490).

Meanwhile, the controlling method of the electronic apparatus described above with reference to FIGS. 11 to 14 may be implemented through the electronic device 100 illustrated and described with reference to FIGS. 2 to 4, 5A, 5B, 6A to 6C, 7A to 7F, 8, 9A, 9B, and 10. Alternatively, the controlling method of the electronic apparatus may also be implemented through a system including the electronic apparatus and one or more external devices.

The electronic apparatus according to one or more embodiments may automatically identify and provide the most appropriate best image frame among a plurality of image frames included in a video even if the user does not press a shutter once the video is photographed.

Further, the electronic apparatus according to one or more embodiments may provide an image frame that accurately matches one or more situations desired by the user using a pre-trained artificial intelligence model. In particular, in analyzing the plurality of image frames in the video using an artificial intelligence model having a limited computational speed, the optimal method may be used and the best image frame may be provided at a fast speed.

Meanwhile, one or more embodiments may be implemented in a computer or a computer readable recording medium using software, hardware, or a combination of software and hardware.

According to a hardware implementation, one or more embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions.

In some cases, one or more embodiments may be implemented as the processor 120 itself. According to a software implementation, procedures and functions described above may be implemented as separate software modules. Each of the software modules described above may perform one or more functions and operations described in the disclosure.

Meanwhile, computer instructions for performing processing operations of the electronic apparatus according to one or more embodiments may be stored in a non-transitory computer readable medium. The computer instructions stored in the non-transitory computer readable medium allow a specific device to perform the processing operations of the electronic apparatus according to one or more embodiments when being executed by a processor of the specific device.

The non-transitory computer readable medium is not a medium that stores data for a short time such as a register, a cache, a memory, or the like, but refers to a machine readable medium that semi-permanently stores data. Specifically, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although embodiments of the disclosure are illustrated and described hereinabove, the disclosure is not limited to the abovementioned specific embodiments, but may be variously modified by those skilled in the art to which the disclosure pertains without departing from the scope and spirit of the inventive concept(s) as claimed at least in the claims. These modifications should also be understood to fall within the scope of the disclosure.

What is claimed is:

1. An electronic apparatus comprising:

a camera;

a processor configured to control the camera; and a memory storing at least one instruction, wherein the processor is configured, by executing the at least one instruction, to:

obtain a plurality of image frames, identify a best image frame from among the plurality of image frames by applying the plurality of image frames to a network model, and provide the identified best image frame, wherein the network model recognizes a plurality of features from the plurality of image frames, and identifies the best image frame based on a first feature recognized in a first image frame among the plurality of image frames, wherein the first feature comprises a facial recognition feature and a body feature of a person recognized in the first image frame, and wherein the network model identifies the best image based on a degree of matching between the first feature, including the facial recognition feature and the body feature, and predetermined feature information.

2. The electronic apparatus as claimed in claim 1, wherein the plurality of image frames include image frames obtained by the camera during a predetermined first time period before a user selection of a user interface button is received and image frames obtained by the camera during a predetermined second time period after the user selection is received.

3. The electronic apparatus as claimed in claim 2, wherein the processor is further configured to execute the at least one instruction to:

control the camera to stop capturing in response to the predetermined second time period elapsing.

4. The electronic apparatus as claimed in claim 2, wherein the processor is further configured to execute the at least one instruction to:

control the camera to capture the plurality of image frames without notifying a user that recording of plural frames has started.

5. The electronic apparatus as claimed in claim 1, wherein the processor is further configured to execute the at least one instruction to:

identify another best image frame from among the plurality of image frames, and provide the identified best image frame and the identified other best image frame on a display of the electronic apparatus, wherein the network model identifies the other best image frame based on a second feature recognized in a second image frame among the plurality of image frames.

6. The electronic apparatus as claimed in claim 5, wherein the second feature comprises a facial recognition feature and a body feature of a person recognized in the second image frame.

7. The electronic apparatus as claimed in claim 1, wherein the body feature is a feature indicative of a jumping movement of a body.

8. A controlling method of an electronic apparatus comprising a camera, the controlling method comprising:

capturing, via the camera, a plurality of image frames;

identifying a best image frame from among the plurality of image frames by applying the plurality of image frames to a network model; and providing the identified best image frame; and wherein the network model recognizes a plurality of features from the plurality of image frames, and identifies a first image frame as the best image frame based on a first feature recognized in the first image frame among the plurality of image frames, wherein the first feature comprises a facial recognition feature and a body feature of a person recognized in the first image frame, and wherein the network model identifies the best image based on a degree of matching between the first feature, including the facial recognition feature and the body feature, and predetermined feature information.

9. The controlling method as claimed in claim 8, wherein the plurality of image frames include image frames obtained by the camera during a predetermined first time period before a user selection of a user interface button is received and image frames obtained by the camera during a predetermined second time period after the user selection is received.

10. The controlling method as claimed in claim 9, further comprising:

controlling the camera to stop capturing in response to the predetermined second time period elapsing.

11. The controlling method as claimed in claim 9, further comprising:

controlling the camera to capture the plurality of image frames without notifying a user that recording of plural frames has started.

12. The controlling method as claimed in claim 8, further comprising:

identifying another best image frame from among the plurality of image frames; and providing the identified best image frame and the identified other best image frame on a display of the electronic apparatus; and wherein the network model identifies the other best image frame based on a second feature recognized in a second image frame among the plurality of image frames.

13. The controlling method as claimed in claim 12, wherein the second feature comprises a facial recognition feature and a body feature of a person recognized in the second image frame.

14. The controlling method as claimed in claim 8, wherein the body feature is a feature indicative of a jumping movement of a body.

15. A non-transitory computer-readable recording medium having recorded therein instructions executable by a processor to perform a controlling method of an electronic apparatus comprising a camera, the controlling method comprising:

capturing, via the camera, a plurality of image frames;

identifying a best image frame from among the plurality of image frames by applying the plurality of image frames to a network model; and providing the identified best image frame;

wherein the network model recognizes a plurality of features from the plurality of image frames, and identifies a first image frame as the best image frame based on a first feature recognized in the first image frame among the plurality of image frames, wherein the first feature comprises a facial recognition feature and a body feature of a person recognized in the first image frame, and wherein the network model identifies the best image frame based on a degree of matching between the first feature, including the facial recognition feature and the body feature, and predetermined feature information.

* * * * *